United States Patent
Meyer et al.

(10) Patent No.: US 11,398,115 B2
(45) Date of Patent: Jul. 26, 2022

(54) WIRELESS COMMUNICATION DEVICES

(71) Applicant: Webfleet Solutions B.V., Amsterdam (NL)

(72) Inventors: Ulf Meyer, Amsterdam (NL); David Zimmerman, Amsterdam (NL)

(73) Assignee: Bridgestone Mobility Solutions B.V., Amsterdam (NL)

(*) Notice: Subject to any disclaimer, the term of this patent is extended or adjusted under 35 U.S.C. 154(b) by 585 days.

(21) Appl. No.: 15/736,236

(22) PCT Filed: Jun. 24, 2016

(86) PCT No.: PCT/EP2016/064717
§ 371 (c)(1),
(2) Date: Dec. 13, 2017

(87) PCT Pub. No.: WO2016/207378
PCT Pub. Date: Dec. 29, 2016

(65) Prior Publication Data
US 2018/0182182 A1    Jun. 28, 2018

Related U.S. Application Data

(60) Provisional application No. 62/184,243, filed on Jun. 24, 2015.

(30) Foreign Application Priority Data

Jul. 2, 2015   (GB) .................................... 1511602

(51) Int. Cl.
*G07C 5/00* (2006.01)
*G07C 5/08* (2006.01)
(Continued)

(52) U.S. Cl.
CPC ............. *G07C 5/008* (2013.01); *B60W 40/09* (2013.01); *G07C 5/085* (2013.01); *G07C 5/0825* (2013.01);
(Continued)

(58) Field of Classification Search
None
See application file for complete search history.

(56) References Cited

U.S. PATENT DOCUMENTS 5,586,130 A * 12/1996 Doyle .................... G07C 5/008
324/110
6,604,033 B1 * 8/2003 Banet .................. G01M 15/102
701/29.4
(Continued)

FOREIGN PATENT DOCUMENTS

CN      101228545 A      7/2008
CN      104597811 A      5/2015
(Continued)

OTHER PUBLICATIONS

Translation of WO 2014/191558 (Year: 2014).*
(Continued)

*Primary Examiner* — Jess Whittington
(74) *Attorney, Agent, or Firm* — Patterson Intelletual Property Law, P.C.

(57) ABSTRACT

A wireless communication device for collecting vehicle on-board diagnostics (OBD) data is disclosed, together with associated methods of handling OBD data in such wireless communication devices. The device comprises a connector for connecting the device to an OBD port of a vehicle to receive OBD data; a processor configured to continually aggregate the OBD data and/or acceleration data from an acceleration sensor into risk profile data during a journey made by the vehicle; a memory for storing the latest risk (Continued)

profile data for the journey; and a wireless transceiver for transmitting the stored risk profile data to an external mobile device during the journey. The processor is further configured to determine an engine state of the vehicle and to detect when the vehicle begins and ends a journey based on said determined engine state and OBD data relating to vehicle speed and/or engine revolutions, and to cause the stored risk profile data to be deleted from the memory upon detection that the vehicle has begun a new journey.

20 Claims, 15 Drawing Sheets

(51) Int. Cl.
*H04W 4/80* (2018.01)
*B60W 40/09* (2012.01)
*G07C 5/10* (2006.01)

(52) U.S. Cl.
CPC ............... *G07C 5/10* (2013.01); *H04W 4/80* (2018.02); *B60W 2510/0628* (2013.01); *B60W 2510/0638* (2013.01); *B60W 2510/0666* (2013.01); *B60W 2510/0676* (2013.01); *B60W 2510/242* (2013.01); *B60W 2520/10* (2013.01); *G07C 2205/02* (2013.01)

(56) References Cited

U.S. PATENT DOCUMENTS

| | | | |
|---|---|---|---|
| 10,445,758 B1* | 10/2019 | Bryer | G06Q 30/0207 |
| 2004/0083041 A1* | 4/2004 | Skeen | G07C 5/008 |
| | | | 701/31.4 |
| 2006/0017552 A1* | 1/2006 | Andreasen | G01D 7/02 |
| | | | 340/438 |
| 2007/0073459 A1* | 3/2007 | Webster | G07C 5/0816 |
| | | | 701/31.4 |
| 2008/0030376 A1* | 2/2008 | Tunnell | G07C 5/085 |
| | | | 340/988 |
| 2008/0082247 A1* | 4/2008 | Hawkins | B60L 15/38 |
| | | | 701/101 |
| 2008/0255722 A1* | 10/2008 | McClellan | G07C 5/008 |
| | | | 701/31.4 |
| 2008/0319602 A1* | 12/2008 | McClellan | G07C 5/008 |
| | | | 701/31.4 |
| 2009/0024273 A1* | 1/2009 | Follmer | G06Q 40/08 |
| | | | 701/33.4 |
| 2010/0023198 A1* | 1/2010 | Hamilton | B60R 16/03 |
| | | | 701/31.4 |
| 2010/0076878 A1* | 3/2010 | Burr | G08G 1/20 |
| | | | 705/34 |
| 2010/0207751 A1* | 8/2010 | Follmer | G01C 21/32 |
| | | | 340/439 |
| 2010/0211249 A1* | 8/2010 | McClellan | G07C 5/006 |
| | | | 701/31.4 |
| 2010/0318257 A1* | 12/2010 | Kalinadhabhotla | G01P 21/00 |
| | | | 701/31.4 |
| 2011/0025486 A1* | 2/2011 | Qian | B60Q 9/00 |
| | | | 340/438 |
| 2011/0035094 A1* | 2/2011 | Van Den Berg | G05B 23/0251 |
| | | | 701/31.4 |
| 2011/0109450 A1* | 5/2011 | Hirschfeld | B60N 2/002 |
| | | | 340/457 |
| 2011/0130916 A1* | 6/2011 | Mayer | G08G 1/127 |
| | | | 701/31.4 |
| 2011/0285524 A1* | 11/2011 | Qian | B60Q 9/00 |
| | | | 340/457 |
| 2012/0109692 A1* | 5/2012 | Collins | G06Q 30/00 |
| | | | 705/4 |
| 2012/0203441 A1* | 8/2012 | Higgins | G07C 5/0858 |
| | | | 701/102 |
| 2012/0213205 A1* | 8/2012 | Tammisetti | H04W 88/06 |
| | | | 370/332 |
| 2012/0239308 A1* | 9/2012 | Miller | G01N 1/2252 |
| | | | 702/24 |
| 2012/0239462 A1* | 9/2012 | Pursell | G07C 5/085 |
| | | | 701/123 |
| 2012/0296567 A1* | 11/2012 | Breed | G01C 21/26 |
| | | | 701/468 |
| 2012/0303392 A1* | 11/2012 | Depura | G06Q 40/08 |
| | | | 705/4 |
| 2013/0049943 A1* | 2/2013 | Wendt | B60W 50/14 |
| | | | 340/439 |
| 2013/0066514 A1* | 3/2013 | Das | H05K 5/0069 |
| | | | 701/31.5 |
| 2013/0073450 A1* | 3/2013 | Swan | G06Q 40/00 |
| | | | 705/39 |
| 2013/0117857 A1* | 5/2013 | Zimmermann | G06F 21/62 |
| | | | 726/27 |
| 2013/0198802 A1* | 8/2013 | Ricci | H04L 67/12 |
| | | | 726/1 |
| 2013/0246135 A1* | 9/2013 | Wang | G07C 5/008 |
| | | | 705/14.4 |
| 2013/0268156 A1 | 10/2013 | Shumann et al. | |
| 2013/0307684 A1* | 11/2013 | Pallotta | H04M 1/72577 |
| | | | 340/539.11 |
| 2014/0005881 A1* | 1/2014 | Hardesty | F02D 41/22 |
| | | | 701/32.8 |
| 2014/0074353 A1 | 3/2014 | Lee et al. | |
| 2014/0195100 A1* | 7/2014 | Lundsgaard | G06Q 50/30 |
| | | | 701/29.6 |
| 2014/0229075 A1* | 8/2014 | Lopez | H02J 3/36 |
| | | | 701/45 |
| 2014/0278074 A1* | 9/2014 | Annapureddy | G08G 1/0141 |
| | | | 701/468 |
| 2015/0025755 A1* | 1/2015 | Willgert | A01D 75/185 |
| | | | 701/50 |
| 2015/0112543 A1 | 4/2015 | Binon et al. | |
| 2015/0154814 A1* | 6/2015 | Kalinadhabhotla | G07C 5/008 |
| | | | 701/31.5 |
| 2015/0163649 A1* | 6/2015 | Chen | H04W 4/80 |
| | | | 455/418 |
| 2017/0309092 A1* | 10/2017 | Rosenbaum | G01M 17/007 |
| 2019/0256162 A1* | 8/2019 | Denholm | H04N 5/77 |

FOREIGN PATENT DOCUMENTS

| | | | | |
|---|---|---|---|---|
| WO | WO2014/191558 A1 * | 4/2014 | | G07C 5/00 |
| WO | 2014191558 | 12/2014 | | |

OTHER PUBLICATIONS

Search Report of United Kingdom application No. GB1511602.3 dated Jan. 15, 2016.
International Search Report of international application No. PCT/EP2016/064717 dated Sep. 21, 2016.
International Search Report of international application No. PCT/EP2016/064717.

* cited by examiner

WIRELESS COMMUNICATION DEVICES

CROSS-REFERENCE TO RELATED APPLICATIONS

The present application is a National Stage of International Application No. PCT/EP2016/064717, filed on Jun. 24, 2016, and designating the United States, which claims benefit to United Kingdom Patent Application 1511602.3 filed on Jul. 2, 2015, which claims benefit to the U.S. Patent Application No. 62/184,243 filed on Jun. 24, 2015. The entire content of these applications is incorporated herein by reference.

FIELD OF THE INVENTION

The present invention relates to wireless communication devices for collecting vehicle on-board diagnostics (OBD) data and associated methods of handling OBD data in such wireless communication devices.

BACKGROUND OF THE INVENTION

A motor vehicle's on-board diagnostics (OBD) system provides self-diagnostic and reporting capability that can enable a vehicle owner or mechanic to access information about the engine and other vehicle sub-systems. All new motor vehicles are now equipped with a standard OBD-II or EOBD connector in line with regulations in force since 1996 in the USA, since 2000 for new passenger cars and LCVs in the EU, and since 2004 for HGVs in the EU. The OBD connection port in a vehicle can provide real-time engine data in addition to standardised diagnostic trouble codes which allow a mechanic to rapidly identify and remedy problems with the vehicle.

More recently, there has become available OBD data collection devices comprising a connector so as to be plugged into a vehicle's OBD port on a long-term basis to receive OBD data for a variety of purposes. For example, the TomTom ecoPLUS™ device can be installed in a vehicle belonging to a fleet so as to provide accurate information on fuel consumption and efficiency which is transmitted to an external server and displayed, for example, to a fleet manager. In another example, insurance companies may provide an OBD data collection device that plugs into a vehicle's OBD port so as to automatically track driving habits and thereby determine the insurance premium payable. This is known as usage-based insurance (UBI).

An example of a UBI data logging device is described in US 2013/0013348 A1. Such a data logging device includes a microprocessor and wireless GSM transceiver so that vehicle usage information can be transmitted to an insurer or other external entity. The data logging device includes a real-time clock so that data stored in the data log can be provided with a time stamp indicating the time of day information is received, and an internal power source that maintains the clock running. WO 2004/040405 A2 provides another example of an OBD data logging module that is configured to plug into the OBD-II port of a vehicle and has a real-time clock and on-board power supply as well as a microprocessor and memory. Even when no power is applied to the module from the OBD port in the vehicle, the real-time clock is maintained by the internal battery so that the collected OBD data can be accurately time-stamped. The module monitors driver habits and has a wireless communication interface so that OBD data can be transmitted to an external computer for interrogation.

It is known, for example, in WO 2014/191558 A1 to aggregate OBD data relating to vehicle use and/or driving performance collected by a logging device into risk profile data. The risk profile data can comprise one or more scalar indicators that each represent a single average value for a particular category of OBD data in a given time period, e.g. 24 hours. The risk profile can, additionally or alternatively, comprise one or more histogram indicators that each represent the distribution of a particular category of OBD data in one or more given ranges. The risk profile data is stored in a memory of the device until, at a later time, the device is paired with an external mobile telecommunications device and a data transmission instruction is received. Upon receipt of such an instruction, the risk profile data is wirelessly transmitted to the external mobile telecommunications device, typically as an encrypted message, and subsequently passed to a remote server. The risk profile data is stored at the server, and can be accessed and/or viewed by the driver of the vehicle or another interested party, e.g. in the form of daily, weekly or monthly summaries, thereby providing retrospective feedback on driving behaviour.

It has been recognised, however, that there are also advantages in providing live feedback on driving behaviour, and feedback after the completion of each trip, such that a driver or other interested party can see real-time insights on vehicle use and driving performance.

Accordingly, there remains a need for an improved OBD data collection device.

SUMMARY OF THE INVENTION

According to a first aspect of the invention there is provided a wireless communication device for collecting vehicle on-board diagnostics (OBD) data, the device comprising:

a connector for connecting the device to an OBD port of a vehicle to receive OBD data;

a processor configured to continually aggregate the OBD data and/or acceleration data from an acceleration sensor into risk profile data during a journey made by the vehicle, said risk profile data comprising one or more scalar indicators and/or histogram indicators;

a memory for storing the latest risk profile data for the journey; and a wireless transceiver for communicating with an external mobile device, wherein the wireless transceiver is configured to wirelessly transmit the stored risk profile data to the external mobile device during the journey, wherein the processor is further configured to determine an engine state of the vehicle and to detect when the vehicle begins and ends a journey based on said determined engine state and OBD data relating to vehicle speed and/or engine revolutions, and wherein the processor is further configured to cause the stored risk profile data to be deleted from the memory upon detection that the vehicle has begun a new journey.

Such an OBD data collection device allows OBD data and/or acceleration to be continually collected and aggregated during a journey made by a vehicle, such that the latest aggregated data can be transmitted to an external mobile device for further processing and/or display thereon. The OBD data and/or acceleration data is continually aggregated during the journey into risk profile data in the form of one or more scalar indicators and/or histogram indicators; thereby reducing the bandwidth requirements for transmitting the risk profile data to the mobile device. The mobile device is preferably located within the vehicle, either as a portable device, such as a mobile telephone (or smartphone), or integrated within the vehicle itself (as an embedded device), such that the mobile device can be used to provide feedback to the driver during the journey on vehicle use and driving performance. The latest risk profile data for a journey is stored in a memory of the device, and is only deleted from the memory upon detection that the vehicle has begun a new journey. This means that the driver can always view the risk profile for the last journey until they start driving again so as to begin a new journey.

As mentioned above, the OBD data and/or acceleration data is aggregated during the journey, such that the risk profile data stored in the memory of the device reflects the current status of the vehicle and/or driving performance during the journey. In other words, the stored risk profile data is updated, typically a plurality of times, during the journey. The risk profile data comprises one or more scalar indicators and/or histogram indicators. Each of the indicators can be updated at the same time, i.e. at the same update frequency, although typically each indicator, or at least some of the indictors, are updated individually, i.e. at different update frequencies, since each indictor is often aggregating data from different sources.

The wireless communication device may collect and aggregate a number of different types of OBD data relating to vehicle use and/or driving performance to provide the risk profile data. The OBD data that is aggregated can be data obtained directly from the OBD port. Additionally, or alternatively, the data obtained from the OBD port can first be processed before it is subsequently aggregated.

Each scalar indictor preferably represents a single value for a particular category of OBD data in a given time period; the time period in this case being the time period from the start of the journey to the current time (or the end of the journey), so as to reflect the current or last journey made by the vehicle. A scalar indictor may be used, for example, to represent one or more of: distance (or mileage), which can be determined using vehicle speed and time; idling time, which can be determined as the sum of the time periods in which the vehicle was determined to be idling (engine running, i.e. rpm>0, but vehicle speed=0); driving time, which can be determined from the total engine run time minus the total idling time; and average speed.

Each histogram indicator preferably represents the distribution of a particular category of OBD data (or acceleration data as will be discussed below) in one or more given ranges. The OBD data is again data collected in the time period from the start of the journey to the current time (or the end of the journey), so as to reflect the current or last journey made by the vehicle. A histogram indicator may be used, for example, to represent one or more of: (i) a driving time by speed profile, which records the time driven in different speed ranges; (ii) a mileage by speed profile, which records the distance travelled in different speed ranges; (iii) an engine rpm profile, which records how long the engine is operated in different rpm ranges; (iv) an engine load profile, which records how long the engine is operated in different load ranges; (v) a throttle usage profile, which records how long the vehicle is driven at different throttle position ranges; and (vi) an engine temperature profile, which records how long the engine is operated at different engine coolant temperature ranges.

The risk profile data may also comprise scalar and/or histogram indicators that are determined based on acceleration data from an acceleration sensor. Although the acceleration data may be supplied to the wireless communication device from an external sensor, preferably the wireless communication device further comprises an acceleration sensor or accelerometer for this purpose. The indicators based on acceleration preferably relate a count of the number of events when acceleration above a predetermined acceleration value is detected (stored as a scalar indicator) and/or a count of the number of events when acceleration is between different acceleration ranges or thresholds (stored as a histogram indicator). For example, acceleration data can be aggregated into histogram indicators including, for example, one or more of: (i) a braking profile, which records the number of braking events with a g force value in different g force ranges; (ii) an acceleration profile, which records the number of acceleration events with a g force value in different g force ranges; (iii) a cornering (right) profile, which records the number of right cornering events with a g force value in different g force ranges; and (iv) a cornering (left) profile, which records the number of left cornering events with a g force value in different g force ranges.

In embodiments of the present invention it is preferable that the wireless communication device does not include a global navigation satellite system (GNSS) receiver, e.g. a GPS receiver, or other location determining device, so that the vehicle's location can't be tracked as part of the data collected by the communication device. This enhances user privacy. However communication devices that use an accelerometer typically rely on location data, in particular speed and direction, for calibration. This is because the orientation of the communication device relative to the vehicle may not be known. The same communication device might be used in different vehicles that have OBD ports installed at different positions and/or angles. It is known, for example from WO 2011/003462 A1, to use a location determining device such as a GPS device to calibrate a vehicle accelerometer device; the entire content of this application is incorporated herein by reference. However an alternative solution is for the OBD data collection device to comprise an accelerometer, wherein the processor is arranged to determine an orientation of the accelerometer based on the collected OBD data. Preferably such a device does not include a GPS receiver or other location determining means. Accordingly the device is able to calibrate the accelerometer using only OBD data, e.g. self-calibration. Once the processor has determined an orientation of the accelerometer, it can transform acceleration data measured by the accelerometer from the frame of reference of the device to the frame of reference of the vehicle. The device is therefore able to calibrate itself to take into account its orientation in the vehicle.

It follows that the OBD data collection device therefore has no fixed installation requirements in the vehicle. As compared to prior art systems that rely on a GNSS receiver, e.g. GPS receiver, to determine the orientation of an accelerometer, devices according to embodiments of the present invention instead takes advantage of the OBD data collected from the vehicle OBD port.

By determining an orientation of the accelerometer relative to the vehicle, the processor may further be configured to rotate an acceleration vector measured by the accelerometer to fit the coordinate system of the vehicle. Any suitable OBD data can be used to determine an orientation of the accelerometer, as long as the processor is able to use the OBD data to accurately determine a vector property of motion of the vehicle, such as acceleration and/or velocity. In broadest terms, the processor may be configured to determine that at least one OBD data satisfies at least one predetermined condition in a predetermined time period so as to indicate vehicle direction. Once the processor has ascertained vehicle direction then it can compare the vehicle direction with an acceleration vector measured by the accelerometer to obtain an angle of orientation of the accelerometer with respect to the vehicle.

The at least one predetermined condition may comprise a condition that a vehicle trajectory property determined from the OBD data matches a vehicle trajectory property measured by the accelerometer. If the vehicle includes its own accelerometer then the OBD data may comprise acceleration and/or deceleration data. If, for example, the processor determines that acceleration data measured by the device's accelerometer matches acceleration data received from the OBD port then the device frame of reference may be considered to be oriented in line with the vehicle frame of reference. However, in practice this may rarely occur. In a preferred set of embodiments the processor is configured to determine an orientation of the accelerometer based on velocity data received from the vehicle OBD port. Such self-calibration may use the direction of an OBD speed vector to inform the processor that the vehicle is moving along a straight line at any instant in time.

So as to reliably detect when the vehicle is moving in a straight line, the processor may look for a linear vehicle acceleration or deceleration, e.g. braking event. In one example, the at least one predetermined condition may comprise a condition that vehicle acceleration determined from the OBD data has a magnitude greater than a predetermined threshold magnitude of acceleration in the predetermined time period. In one example, the at least one predetermined condition may comprise a condition that the vehicle acceleration magnitude determined from the OBD data varies by less than a predetermined amount or proportion in the predetermined time period. In one example, the at least one predetermined condition may comprise a condition that a direction of acceleration determined from the OBD data has an angular variation less than a predetermined threshold angle in the predetermined time period. In one example, the at least one predetermined condition may comprise a condition that a direction of velocity or acceleration determined from the OBD data is substantially constant in the predetermined time period.

The processor is preferably configured to determine when the magnitude of an OBD speed vector is increasing or decreasing for longer than a predetermined time period, e.g. a minimum threshold of three seconds. Further preferably the processor is configured to monitor the OBD speed vector in the xy-plane, determining when the vector has a constant direction indicating linear movement of the vehicle in the x-direction, e.g. aligned with the vehicle's forward direction of motion or braking direction. A variance in the direction of the OBD speed vector may be calculated, and compared by the processor to a limit, to ensure accuracy. During this time the processor may also monitor that the OBD speed vector has a magnitude that remains above a threshold value. The processor is then able to compare the direction of an acceleration vector measured by the accelerometer with the determined x-direction of the vehicle, and produce a calibration constant corresponding to the z-rotation between the two frames of reference. This calibration constant can be used by the processor to transform acceleration data measured by the accelerometer to the vehicle frame of reference before it is transmitted to an external mobile telecommunications device.

Accordingly the device is able to automatically calibrate, i.e. learn the relative orientation of the accelerometer, so as to be able to accurately identify acceleration/deceleration, cornering and/or braking events. The accelerometer is preferably arranged to detect a crash event. For example, a crash event may be indicated by detecting an acceleration/deceleration force greater than a predetermined threshold value, e.g. >1.5 g.

As discussed above, the risk profile data is updated during a journey made by the vehicle, such that the risk profile data reflects vehicle and driving performance during the journey, and the latest, i.e. most recent and up to date version, of the risk profile data is stored in a memory of the device. The memory may include a plurality of sets of risk profile data with each set indicative of a different time within the journey. However, in preferred embodiments, only the latest risk profile data is stored in the memory; thereby reducing the amount of memory needed by the device. The memory is preferably non-volatile memory, such that the risk profile data for the last journey is retained when the wireless communication device is no longer powered by the vehicle (since the device preferably does no comprise an internal battery as discussed in more detail below).

The processor is configured to determine an engine state of the vehicle, for example by monitoring a voltage at the connector and/or by using OBD relating to vehicle speed and/or engine revolutions. In embodiments, the processor detects an engine 'on' state from a temporary voltage drop of at least a predetermined magnitude. Additionally, or alternatively, the processor may detect an engine 'off' state from a voltage value that is less than a threshold in combination with OBD data relating to vehicle speed and/or engine revolutions. Such an OBD data collection device is able to reliably detect both engine 'on' and 'off' states in modern vehicles that use "smart charging" technology and engine control units (ECUs) that may report constant non-zero values for speed and/or engine revolutions (rpm) even after the engine has been stopped. As will be appreciated, "smart charging" technology is a form of regulated voltage control that uses system information to optimise the voltage supplied to the battery. A "smart charging" alternator, controlled by an ECU, may allow the charging voltage to drop below the normal charging range, e.g. of 13.8 to 14.8 V. As the charging voltage may fluctuate while the engine is running, it can become unpredictable for an OBD device to reliably detect engine state solely based on voltage levels.

Previous proposals to monitor either voltage levels or speed/rpm alone so as to detect the engine state, especially the engine 'off' state, may not have accurately sensed both engine 'on' and engine 'off' events, resulting in errors in the collection of OBD data. It can be particularly important to detect the engine 'off' state, because if the OBD device were to continue taking power from the vehicle OBD port after the engine has been stopped then this could run down the vehicle battery.

In order to reliably detect a true engine 'off' state, the processor in the OBD data collection device may undergo a two-stage detection process. Firstly, a pending engine 'off' state may be flagged as a result of detecting a voltage value, optionally an average voltage value, that is less than a threshold. For example, the voltage at the connector falling below a threshold of 13.2 volts (V) may be taken as a first (but not definitive) indication that the engine has been stopped. Thus in a set of embodiments the processor detects a pending engine 'off' state from a voltage value, or average voltage value, that is less than a threshold for a predetermined time period, e.g. of at least 1 second (s) or 2 s, and preferably at least 3 s. The threshold may be at least 13 V, preferably around 13.2 V. Secondly, this is taken in combination with OBD data relating to vehicle speed and/or engine revolutions.

In a set of embodiments the processor confirms the pending engine 'off' state from OBD data relating to vehicle speed and/or engine revolutions being constant for another predetermined time period, e.g. of at least 1, 2, 3 or 4 seconds. Preferably the processor confirms a pending engine 'off' state from OBD data relating to vehicle speed and/or engine revolutions being constant for a predetermined time period of at least 5 seconds. The constant value may be zero or non-zero, as some vehicles can report non-zero values for speed and engine revolutions even after the engine has stopped running.

Alternatively (or in addition), in another set of embodiments the processor confirms the pending engine 'off' state from OBD data relating to vehicle speed and/or engine revolutions no longer being received at the vehicle OBD port. This is indicative of the vehicle's ECU no longer providing such OBD data to the vehicle OBD port. The processor may detect the absence of such OBD data from an invalid input.

Following this two-stage process, the processor may then detect a transition from the pending engine 'off' state to a final engine 'off' state after a further predetermined time period, e.g. of at least 10 seconds, has elapsed. This ensures that a false detection of the engine 'off' state is avoided.

Preferably the processor is arranged to stop collection of the OBD data when the final engine 'off' state is detected. Thus, only once the processor has run the two-stage detection process above is it determined that the engine is truly 'off' and OBD data collection may be halted. This can prevent erroneous OBD data collection in vehicles equipped with "smart charging" technology. When it is finally determined that the engine is not running then, after a certain time period, the device may enter a sleeping mode in which no power is taken from the vehicle OBD port. The device therefore saves power in between trips.

In order to reliably detect a true engine 'on' state, the processor in the OBD data collection device detects a temporary voltage drop rather than simply comparing the voltage level at the connector to an absolute threshold, e.g. 13.2 V. In a set of embodiments the processor detects an engine 'on' state from a temporary voltage drop of a predetermined magnitude, e.g. at least 2 volts, that lasts for a time period of less than 1 second. Preferably the processor detects an engine 'on' state from a temporary voltage drop of a predetermined magnitude, e.g. at least 2 volts, that lasts for a time period of at least 400 ms and less than 1 s. Further preferably the processor detects an engine 'on' state from a temporary voltage drop of at least 3 volts. Since the temporary voltage drop may appear only as a brief "spike" in the detected voltage level, the processor must be able to distinguish this from other, typically smaller, changes in the voltage level, e.g. resulting from "smart charging". In a set of embodiments the processor detects an engine 'on' state by sampling the voltage at the connector at a frequency of at least 4 Hz, 5 Hz, 6 Hz, 7 Hz, or 8 Hz.

As is mentioned above, the processor of the wireless communication device is arranged to detect when the vehicle begins and ends a journey based on a determined engine state and OBD data relation to the vehicle speed and/or engine revolutions. For example, in embodiments, a new journey can be determined to have begun when there is a predetermined period of time between a detected engine 'off' state and a detected engine 'on' state, and the vehicle is detected to have begun driving, e.g. based on the vehicle speed and/or engine speed (or revolutions) being greater than zero. The predetermined period of time can be any desired value, but is preferably 1, 2 or 3 hours.

As will be appreciated, the detection of an engine 'on' state may also act to awaken the OBD data collection device from a sleeping mode and cause a transition to a running mode. Alternatively, or in addition, the device may be woken from its sleeping mode by receiving a pairing request from an external mobile telecommunications device.

In embodiments, the wireless communication device preferably includes a real-time clock powered by the connector and arranged to apply time stamps to the OBD data, e.g. as it is collected, and/or to apply time stamps to determined events, such as a detected engine 'on' state, a detected engine 'off' state, etc. Optionally the real-time clock may be provided with a back-up power supply internal to the device, e.g. a battery, so that the clock keeps running even if the device is disconnected from the vehicle OBD port. However, to keep, the OBD data collection device compact, it is preferable that the device does not have an internal power supply. In such embodiments, the processor of the device is preferably further arranged to determine when the device has been disconnected from the vehicle OBD port and corrects the time-stamped data by synchronising with an external reference clock signal provided by the external mobile device, e.g. mobile telecommunications device. In such embodiments, the time stamp associated with a detected engine 'on' state is preferably corrected using the external reference clock signal before it is compared to the time stamp of a previously detected engine 'off' state, so as to correctly determine the time period elapsed between the engine of the vehicle being turned off and on.

In certain embodiments, the device may determine when it has been disconnected from a vehicle OBD port by determining that power has been disconnected from the connector. Optionally, the disconnection event may be given a time stamp by the real-time clock. The disconnection event may then be logged with a time stamp in the device's memory. One or more disconnection events may take place before the wireless communication device is next paired with an external mobile device. The time stamps of the disconnection events can be used to calculate the time that elapsed before the device was re-connected and therefore the applicable time correction factor. It will be appreciated that time-stamped data collected between different disconnection events may therefore be corrected using a different time correction factor once the device synchronises with an external reference clock signal.

When a mobile device is paired with the OBD data collection device, the device may carry out the clock synchronisation process described above, e.g. whenever it determines that the time-stamped OBD data is out of sync because it has been disconnected (one or more times) from the vehicle's OBD port since the last time it was paired. Either the wireless communication device or the mobile device may initiate clock synchronisation. Once the time-stamped data has been corrected by synchronising with the external reference clock signal, the mobile device preferably communicates a data transmission instruction to the wireless communication device.

It is a preferred feature of various embodiments of the present invention that the OBD data collection device does not include its own connection to a telecommunications network, e.g. GSM, GPRS or the like. Unlike conventional UBI data collection devices, user privacy may be respected by avoiding real-time tracking of driver habits. Instead it may be under a user's control to pair a mobile telecommunications device with the wireless communication device that is collecting OBD data. The wireless transceiver is preferably a short-range transceiver using infrared or radio frequency communication, e.g. Bluetooth protocol. Of course the mobile telecommunications device preferably includes a corresponding wireless transceiver configured with the same protocol.

The wireless transceiver is preferably arranged to transmit the stored risk profile data to the external mobile device at a predetermined frequency during the journey. This predetermined frequency can be any desired value, and may be, and typically is, different from the frequency at which the risk profile data stored in the memory is updated. In embodiments, for example, the risk profile data is transmitted to the mobile device every 30 seconds, 1 minute or 2 minutes. The predetermined frequency may in some embodiments be set by an application (or "app") running on the mobile device. The risk profile data received by the mobile device, e.g. mobile telecommunications device, is preferably used, either directly or indirectly, e.g. via an app running on the mobile device, to display information to a driver relating to vehicle use and/or driving performance in real-time during a journey. For example, in preferred embodiments, the mobile device can be arranged to use the received risk profile, such as the idling time scalar, the acceleration profile, the braking profile, the cornering profile(s), etc, to determine one or more score values for the particular journey being travelled or that has just travelled. Through the display of these score values, the driver is able to quickly, e.g. simply by glancing at the display of the mobile device, ascertain their driving performance during the current journey. The driver, e.g. at an end of a journey, is also able to provide a user input on the mobile device to cause data about their latest journey to be shared with other drivers, e.g. via any desired social media platform.

The mobile device can also be arranged to provide, e.g. display, real-time OBD data received from the device, i.e. in addition to the risk profile data. Such OBD data, which is indicative of current vehicle conditions, can include, for example, one or more of: battery voltage; engine load; engine coolant temperature; engine rpm; vehicle speed; intake manifold pressure; intake air temperature; throttle position; engine torque; and fuel rate.

The present invention therefore extends to a collection system for vehicle on-board diagnostics (OBD) data, the system comprising: (a) a wireless communication device for collecting OBD data as described hereinabove; and (b) a mobile device, such as a mobile telecommunications device, operatively in communication with the wireless communication device to receive risk profile therefrom. The mobile device preferably comprises a user interface for providing, e.g. visually, audibly or haptically, information based on the received risk profile data to the driver.

As discussed above, the wireless communication device is arranged to determine and store risk profile data for the current (or last) journey, and which can be called "live risk profile data" in that it reflects current vehicle use and/or driving behaviour. In embodiments, the device may be further arranged to additionally determine and store risk profile data for a given time period as is described in WO 2014/191558 A1, the entire content of which is incorporated herein by reference, and which can be called "background risk profile data" in that it reflects historic vehicle use and/or driving behaviour collected and aggregated in the background on the device. The creation of the live and background risk profile data is preferably performed in parallel by the processor of the device. The background risk profile data may be stored in the memory of the device for an extended period of time, e.g. up to 10 days, 20 days, 30 days, 40 days or even 50 days, before being transmitted to the mobile device, e.g. until such a time as when a data transmission instructions is received. The mobile device is preferably a mobile telecommunications device, such that the device can act as a gateway for uploading the background risk profile data to an external server. The external server can ensure secure long-term storage of the uploaded OBD data.

In one set of embodiments the mobile telecommunications device may automatically instruct transmission of the background risk profile data whenever it pairs with the wireless communication device. In another set of embodiments, the mobile telecommunications device may communicate a data transmission instruction for the background risk profile data when commanded to do so by a user. This provides a user with flexibility in deciding when data is transmitted from the OBD data collection device. However it is desirable that background risk profile data is not stored indefinitely in the memory of the OBD data collection device, especially so that the size of the memory can be limited. The mobile telecommunications device may therefore prompt a user to instruct transmission of background risk profile data from the OBD data collection device when it determines that no data has been received for a certain period of time, e.g. over 20 days.

In some embodiments, the user interface of the mobile device can be used to provide, e.g. visually, audibly or haptically, information to the driver based on the received live risk profile data from the wireless communication device, and to provide information to the driver based on background risk profile data for the driver that has been accessed or obtained from the server.

According to a further aspect of the invention there is provided a method for transmitting vehicle on-board diagnostics (OBD) data collected by a wireless communication device to an external mobile device, comprising:
  receiving OBD data from an OBD port of a vehicle;
  continually aggregating the OBD data and/or acceleration data from an acceleration sensor into risk profile data during a journey made by the vehicle, said risk profile data comprising one or more scalar indicators and/or histogram indicators;
  storing the latest risk profile data for the journey in a memory; and
  wirelessly transmitting the stored risk profile data to the external mobile device during the journey,
  the method further comprising:
  determining an engine state of the vehicle and detecting when the vehicle begins and ends a journey based on said determined engine state and OBD data relating to vehicle speed and/or engine revolutions; and
  deleting the stored risk profile data from the memory upon detection that the vehicle has begun a new journey.

Embodiments of such a method may comprise any of the features described hereinabove.

The methods in accordance with the present invention may be implemented at least partially using software, e.g. computer programs. The present invention thus also extends to a computer program comprising computer readable instructions executable to perform a method according to any of the aspects or embodiments of the invention.

The invention thus also extends to a computer software carrier comprising software which when used to operate a system or apparatus comprising data processing means causes, in conjunction with said data processing means, said apparatus or system to carry out the steps of the methods of the present invention. Such a computer software carrier could be a non-transitory physical storage medium, such as a ROM chip, CD ROM or disk, or could be a signal, such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Some preferred embodiments of the present invention will now be described, by way of example only, and with reference to the accompanying drawings, in which.

DETAILED DESCRIPTION OF THE PREFERRED EMBODIMENTS

Figure 1:
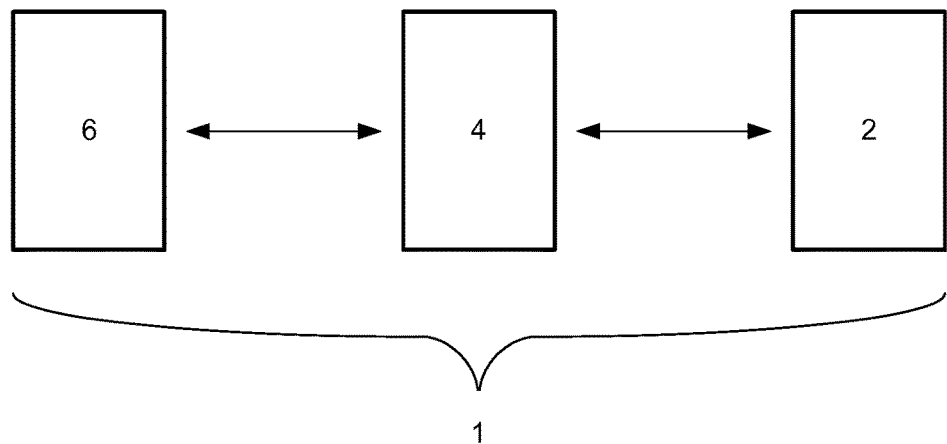
FIG. 1 is a schematic overview of a collection system for vehicle on-board diagnostics (OBD) data.

From FIG. 1 it will be understood that a collection system 1 for vehicle on-board diagnostics (OBD) data generally comprises a wireless communication device or dongle 2, a mobile telecommunications device such as a smartphone 4, and an external server 6. While the dongle 2 collects OBD data from a vehicle OBD port, it is a user's smartphone 4 that provides user interaction and data transmission. The dongle 2 may pair with the smartphone 4 using Bluetooth or other short-range wireless communication protocol. Long-term storage of OBD data and risk profile data is provided by the external server 6 so as to ensure data security and integrity.

Figure 2:
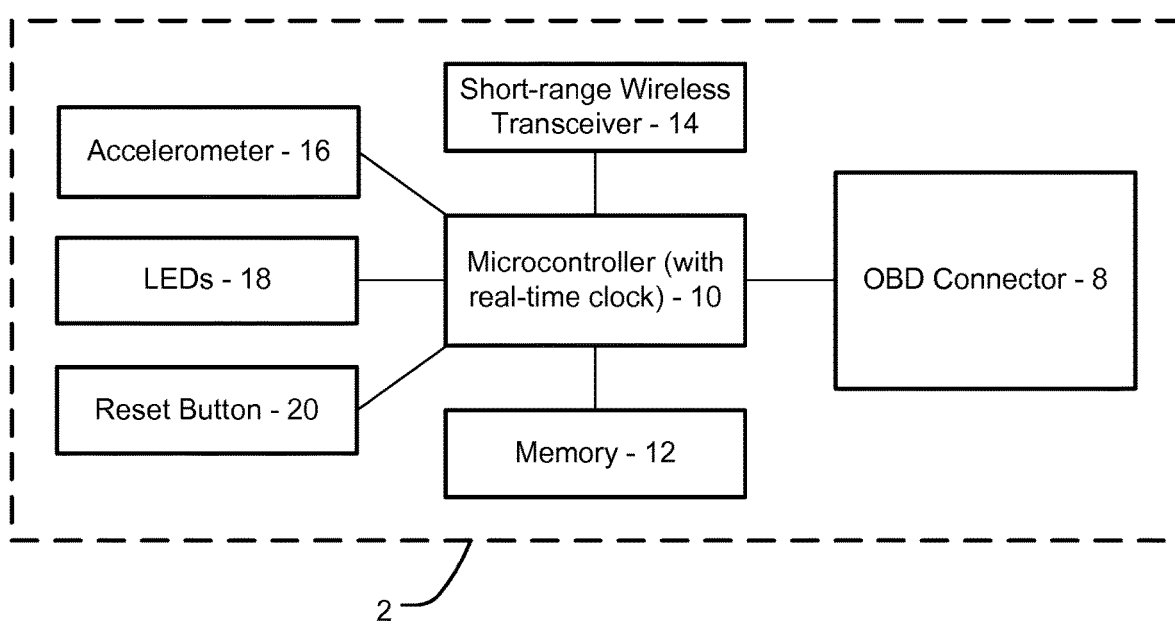
FIG. 2 is a block diagram of an exemplary a wireless communication device for use in such a system.

An exemplary wireless communication device or dongle 2 is seen from FIG. 2 to include a physical connector 8 that can mate with a vehicle OBD port to receive OBD data and power. The internal components of the dongle 2 comprise a processor 10 (such as a microcontroller), which includes a real-time clock, a memory 12 (such as a flash memory), a wireless (e.g. Bluetooth) transceiver 14, an optional accelerometer 16, one of more LEDs or other indicators 18, and a reset button 20. The real-time clock is arranged to apply time stamps to the collected OBD data before it is stored in the memory 12. The microcontroller 10 may aggregate the OBD data into risk profile data before it is stored in the memory 12, as will be described in more detail below.

Figure 3A:
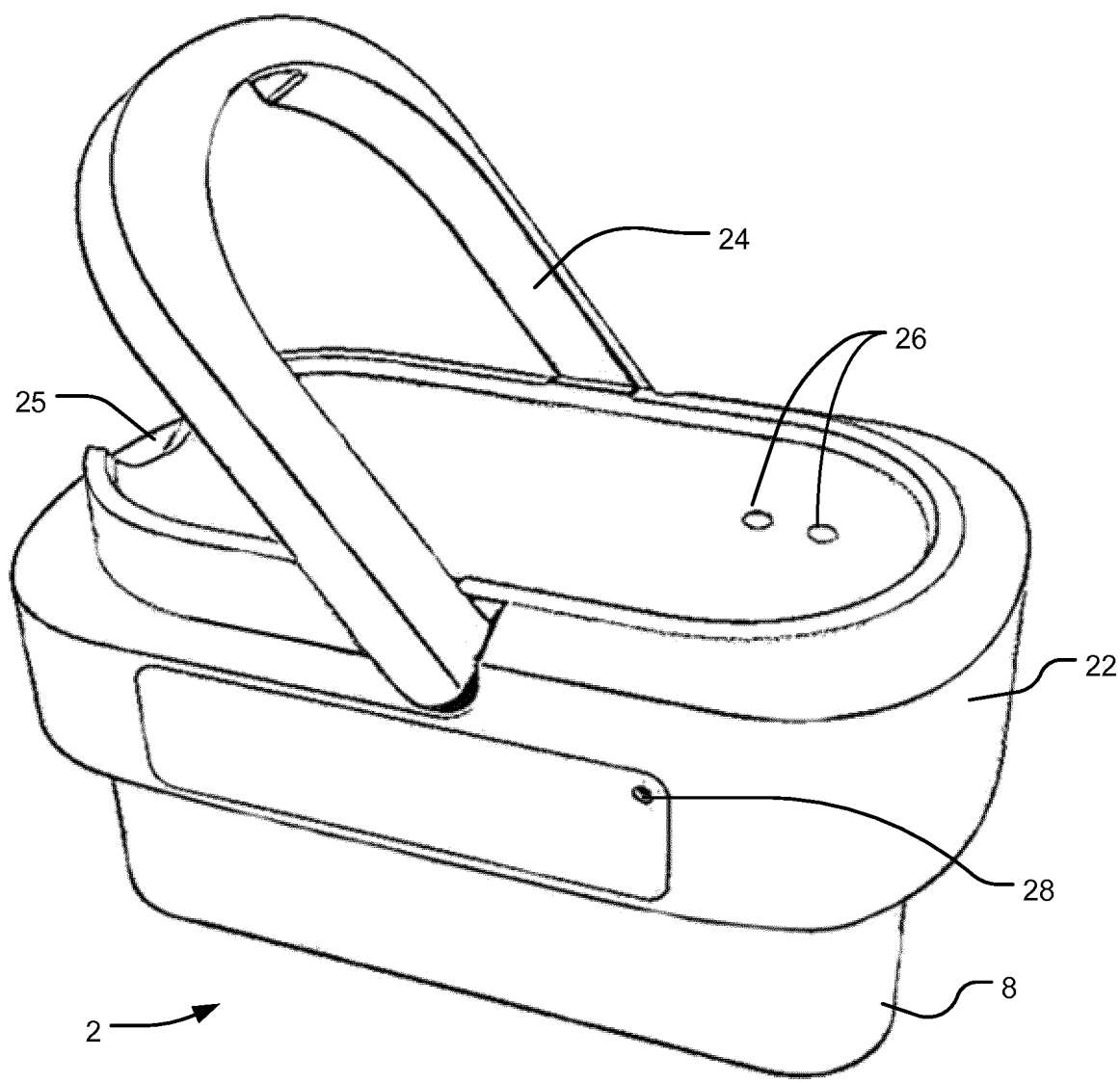
FIGS. 3A to 3C illustrate various possible physical embodiments of such a wireless communication device.
Figure 3B:
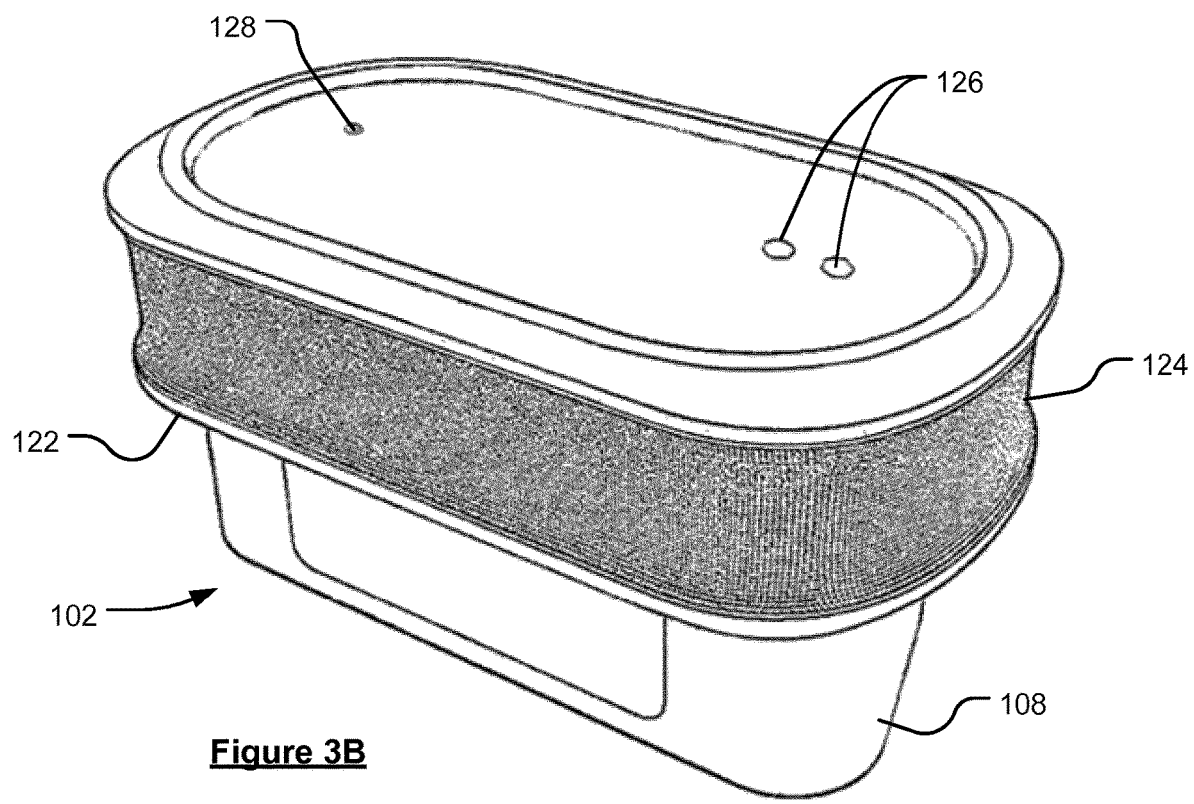
Figure 3C:
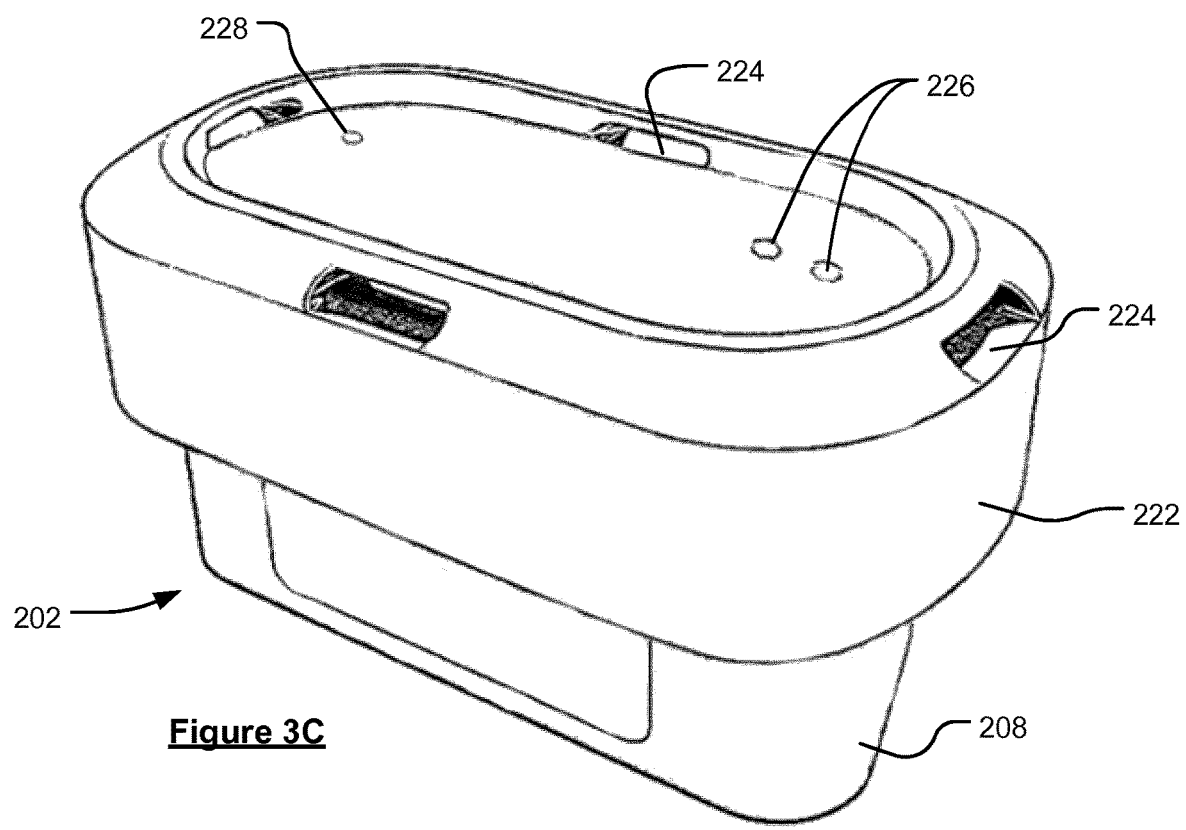

Some possible physical embodiments of such a dongle 2 are shown in FIGS. 3A to 3C. In FIG. 3A the dongle 2 has the connector 8 integrated with a housing 22 for the internal components. A handle 24 is hingedly connected to the housing 22 so that a user can easily remove the dongle 2 by lifting the handle 24 to pull the connector 8 out of a vehicle OBD port. The handle 24 is flush with an upper surface of the housing 22 when it is not in use and a fingernail indentation 25 in the housing 22 enables a user to lift the handle 24 up. Two LEDs 26 visible on the upper surface of the housing 22 can inform a user about the status of the dongle 2. A reset switch 28 is provided on a side of the housing 22. In FIG. 3B the dongle 102 is similar, comprising a connector 108, housing 122 and indicator LEDs 128. However in this embodiment the dongle 102 is designed to be removed from a vehicle OBD port by a user grabbing the housing 122, which has a recessed groove 124 around its perimeter to aid with gripping. A reset switch 128 is provided on the upper surface of the housing 122 so that it is not accidentally pressed when a user grabs the dongle 102. In FIG. 3C the dongle 202 comprises a connector 208 and housing 222, with indicator LEDs 228 and a reset switch 228 provided on an upper surface of the housing 222. In this embodiment the housing 222 is provided with a number of apertures 224 that enable a cable or lanyard to be threaded through, so that a user can pull the cable of lanyard to release the dongle 202 from a vehicle OBD port. In all of these embodiments the height of the dongle 2 is only 20-25 mm, in particular 24-25 mm, so that dongle 2 does not unduly protrude from the recess of a vehicle OBD port.

Figure 4:
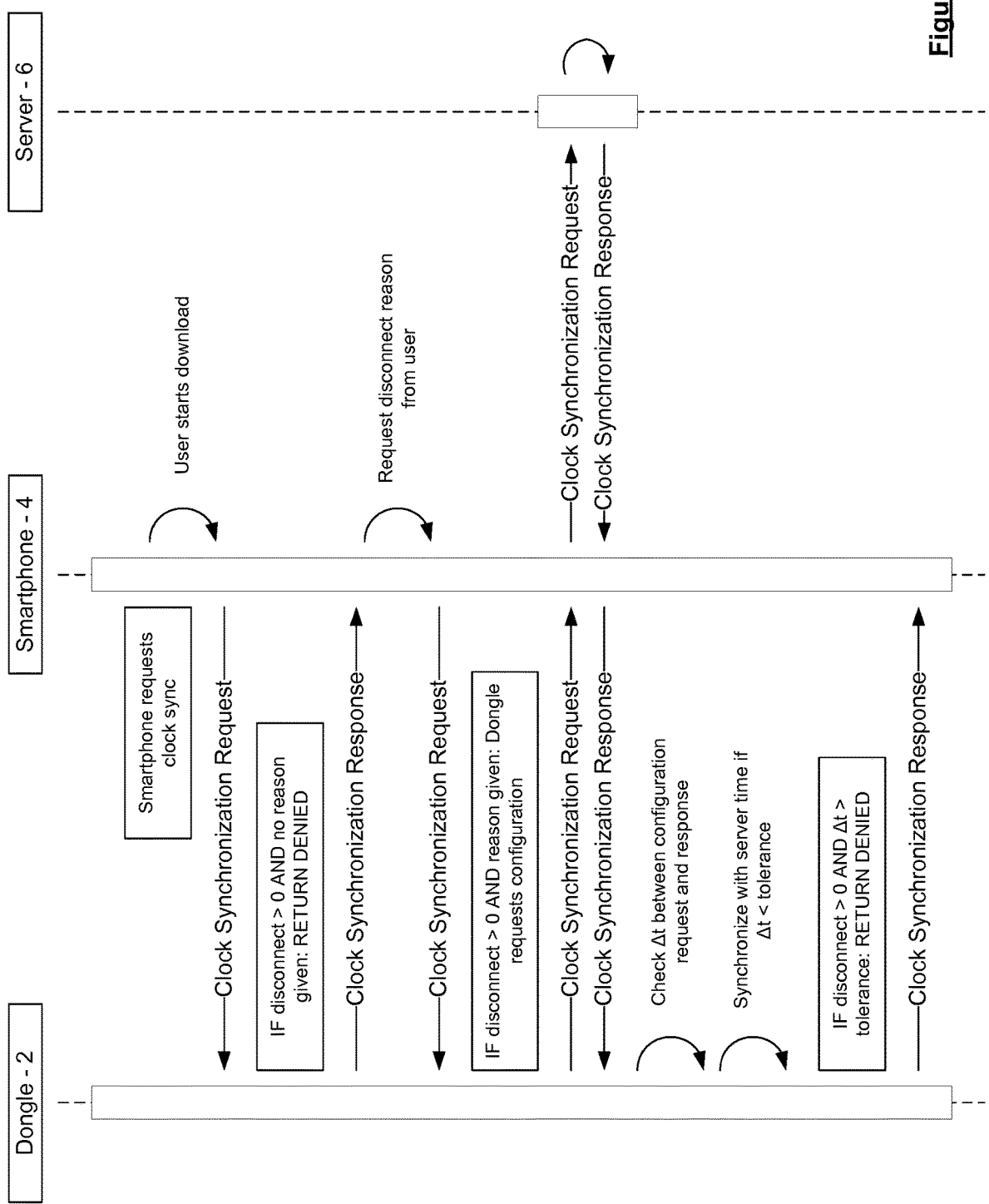
FIG. 4 illustrates a process for clock synchronisation.

FIG. 4 illustrates how the dongle 2 uses external clock synchronisation to correct the time stamps applied by a real-time clock (RTC) without battery backup. When the dongle 2 is paired with a smartphone 4, the smartphone 4 may initiate clock synchronisation by sending a "Clock Synchronization Request" message before any data is uploaded. The dongle 2 then determines whether or not it has been disconnected from the power supply of a vehicle OBD port since the last data upload. If the dongle 2 has been disconnected, e.g. disconnect >0, then the dongle 2 sends a "Clock Synchronization Request" message to the smartphone 4. Optionally, the dongle 2 may also require a reason for disconnect to be given by the smartphone user. The smartphone 4 transmits the "Clock Synchronization Request" message to the external server 6 and the dongle 2 waits for a "Clock Synchronization Response" message to be transmitted back via the smartphone 4. This message contains a reference clock signal which is used by the dongle 2 to synchronise the time-stamped OBD data and correct the OBD data before it is uploaded via the smartphone 4. After a successful clock synchronisation process, the dongle 2 replies to the smartphone 4 with a "Clock Synchronization Response" message containing a result code. The dongle 2 then starts uploading data stored in its memory 12 by sending an "Upload Response" message with a positive result code, as will be described with reference to FIG. 6.

Figure 5:
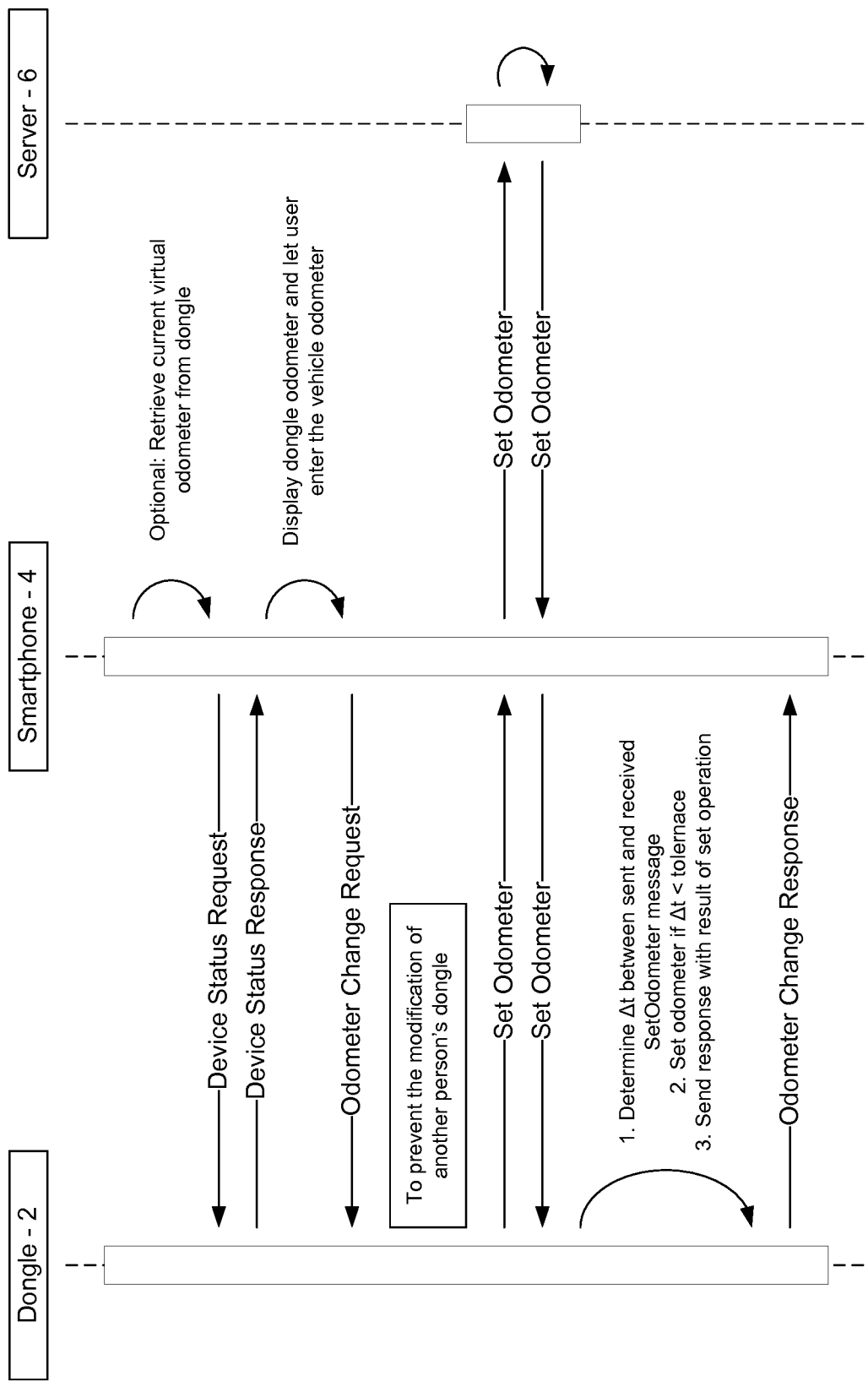
FIG. 5 illustrates a process for calibration of a virtual odometer.

FIG. 5 illustrates a process for setting the dongle's virtual odometer. The virtual odometer counts the distance driven by a vehicle based on OBD data received from the vehicle OBD port, namely vehicle speed in combination with the driving time counted by the real-time clock. The odometer readings are stored in the dongle's memory 12. When the dongle 2 is paired with a smartphone 4, it is first checked whether there is a dual session, i.e. the smartphone 4 has an Internet connection with the external server 6. This is to provide security when changing the dongle's odometer. The smartphone 4 displays the dongle's virtual odometer reading and invites a user to validate or enter the vehicle's actual odometer reading. The smartphone 4 requests the dongle 2 to change its virtual odometer by sending a "Odometer Change Request" message that contains the odometer value entered by the user. The dongle 2 sends this new odometer value to the server 6 using a "Set Odometer" message and the server then sends a "Set Odometer" response back to the dongle 2. The dongle 2 then sets the new odometer value before sending a "Odometer Change Response" message with a status indicating whether the new odometer value was set in the dongle 2. The messaging detours via the server 6 are an additional security means to prevent attackers from setting the odometer. However, this can be omitted and the odometer instead set by exchanging only four messages between the dongle 2 and smartphone 4. The odometer setting process may be carried out every time that the dongle 2 is paired with a smartphone 4 for data upload.

Figure 6:
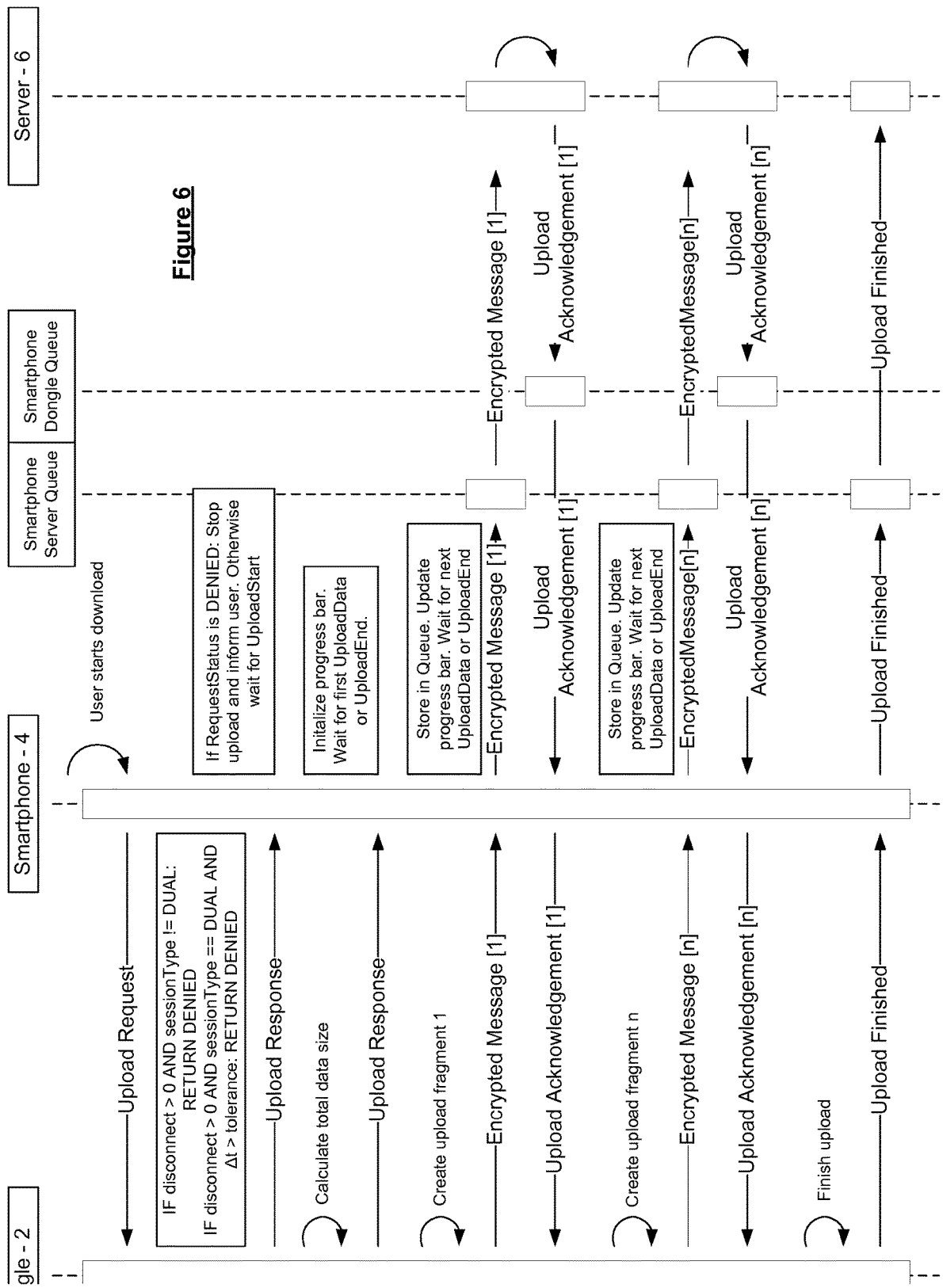
FIG. 6 illustrates a process for uploading data from a wireless communication device.

FIG. 6 illustrates a typical data upload process between the dongle 2, smartphone 4 and external server 6. In this example a user initiates download using the smartphone 4 and a data transmission instruction in the form of an "Upload Request" message is sent to the dongle 2. However the smartphone 4 may initiate data upload without user interaction, e.g. if automatic data upload is enabled. After receiving the "Upload Request" message, the dongle 2 first checks whether a clock synchronisation is required. If so, the dongle 2 replies with an "Upload Response" message having a result code to indicate that clock synchronisation is required and the smartphone 4 then triggers the clock synchronisation process (see FIG. 4). Otherwise, the dongle 2 starts uploading data by sending an "Upload Response" message with a positive result code, followed by several "Upload Data" messages. Each "Upload Data" message may contain data in the form of scalar performance indicators and/or histogram performance indicators. With an "Upload Finished" message the dongle 2 informs the smartphone 4 that all "Upload Data" messages have been sent and the upload process is finished. The smartphone 4 forwards the "Upload Finished" message to the server 6. The server 6 stores a time stamp when the last "Upload Finished" message is received so as to determine when to send an upload push notification to the smartphone 4 that will prompt a user to provide a data transmission instruction, e.g. if no data has been uploaded in the last 20 days.

Figure 7A:
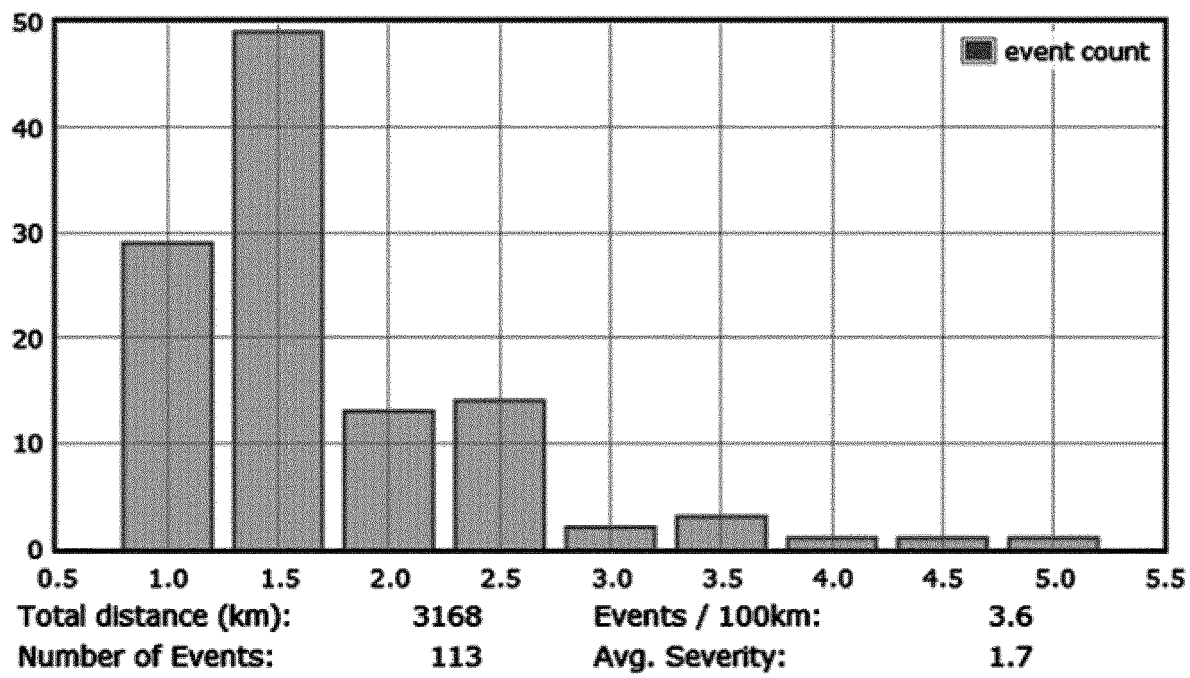
FIGS. 7A to 7D provide examples of histogrammed performance indicators.
Figure 7B:
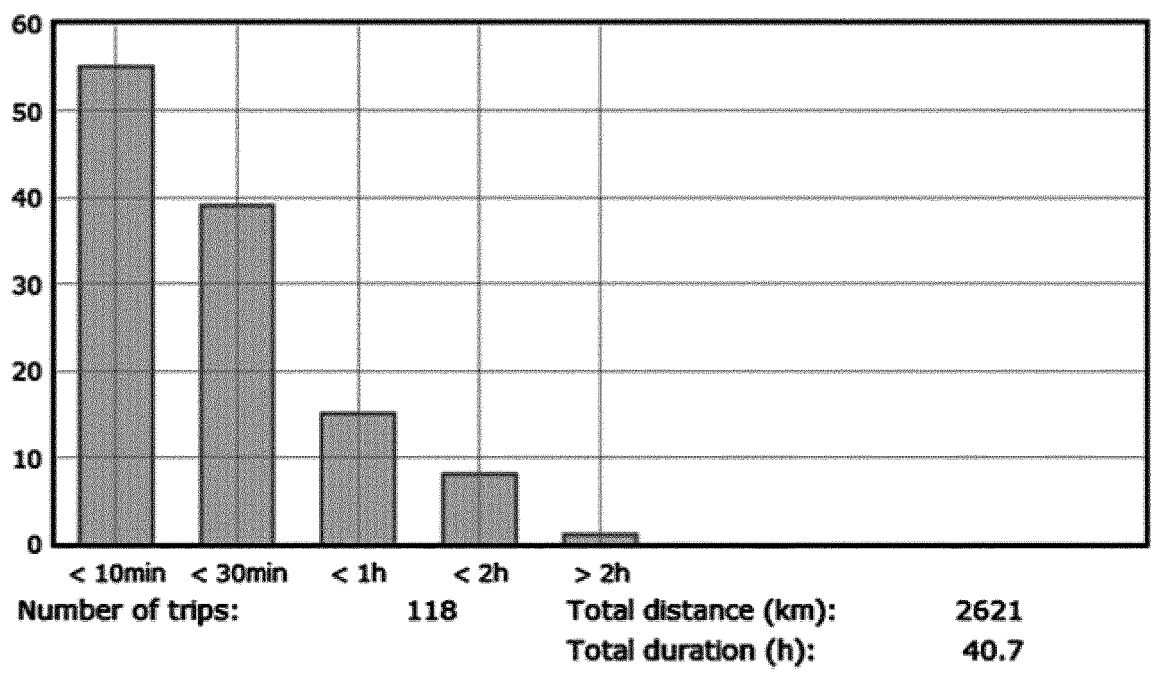
Figure 7C:
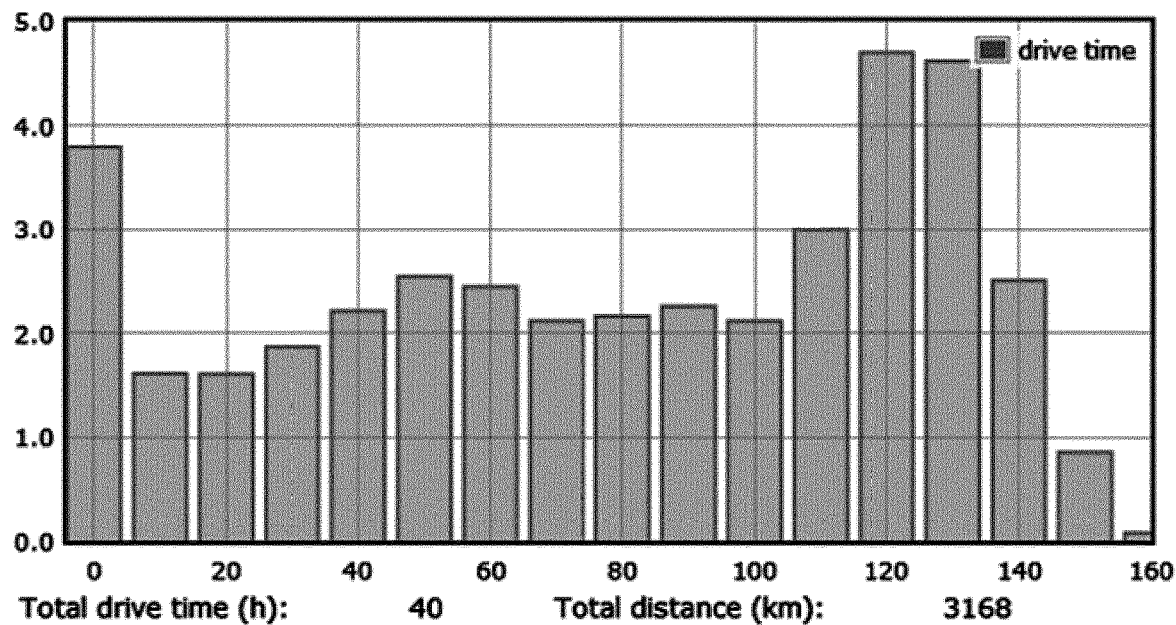
Figure 7D:
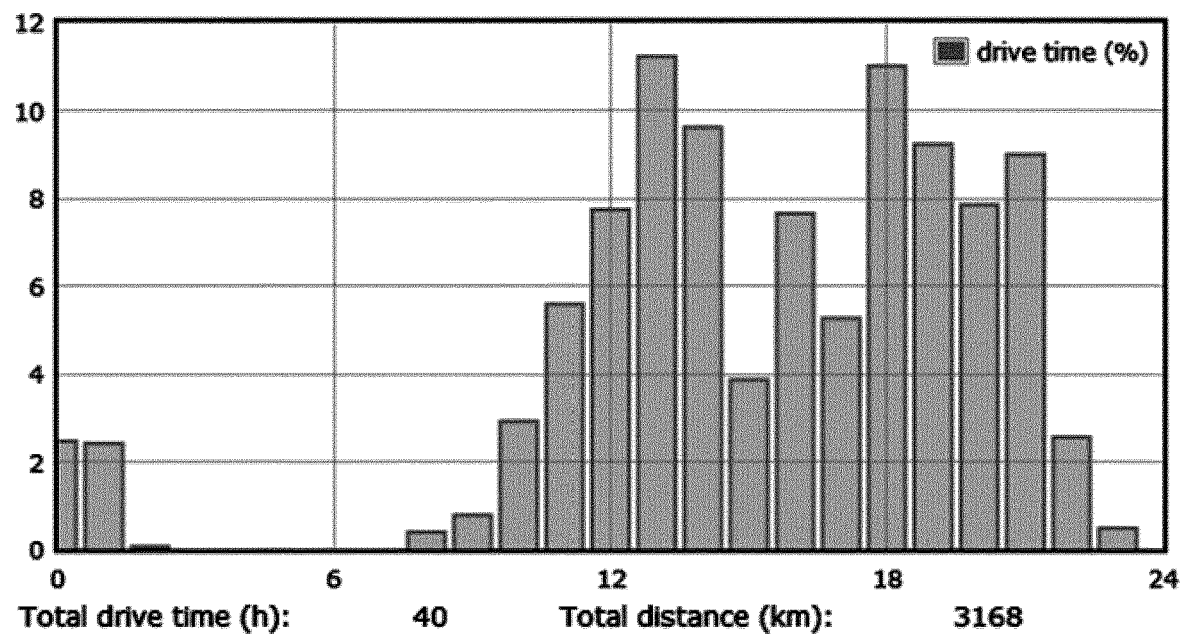

So as to enable the dongle 2 to collect and store OBD data in its memory 12 for extended periods of time between upload processes, e.g. up to at least 30 days, the dongle's microcontroller 10 aggregates the raw OBD data into risk profile data and logs the risk profile data on a daily basis. The raw profile data may comprise scalar performance indicators that are represented by a single value per day for OBD data such as mileage (based on the virtual odometer), driving time (calculated from total engine running time minus total idling time), idling time, number of trips, average trip duration, average trip distance and number of cold starts. The raw profile data may comprise histogram performance indicators that are represented by aggregated values to show the distribution of measured OBD data in different ranges, e.g. the time the engine was operated in different rpm ranges of 0-500 rpm, 501-1000 rpm, etc. These ranges are predefined by the microcontroller 10, so the dongle 2 only needs to store a fixed amount of data for each range. FIGS. 7A to 7D provide some examples of histogram performance indicators used to create the risk profile data that is stored in the dongle's memory 12. FIG. 7A shows a braking events distribution, FIG. 7B shows a trip duration distribution, FIG. 7C shows a driving time distribution by vehicle speed, and FIG. 7D shows a driving time distribution by time of day.

Figure 8A:
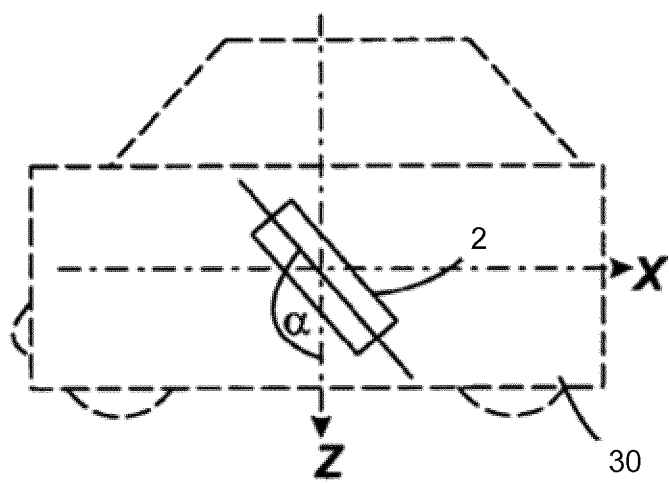
FIGS. 8A to 8C are schematic diagrams showing the orientation of a wireless communication device in a vehicle.
Figure 8B:
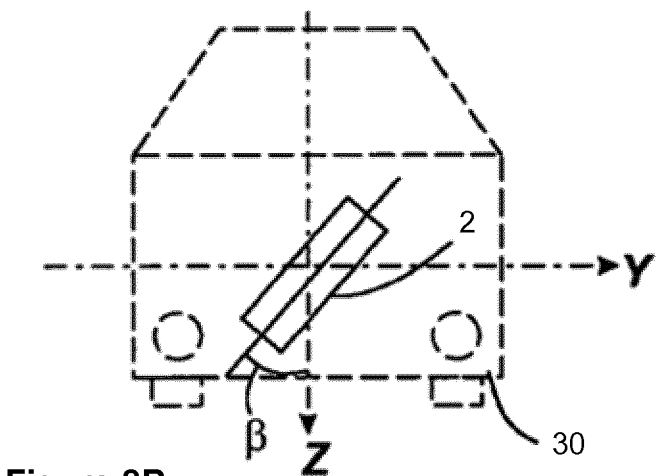
Figure 8C:
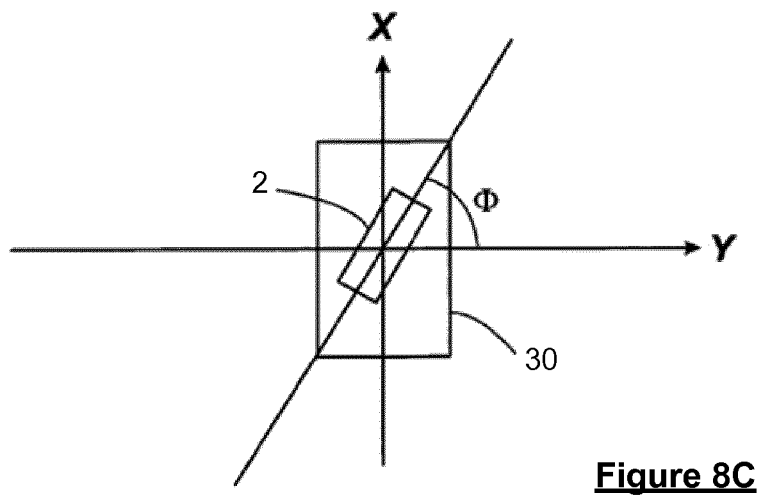

It will now be described how the dongle 2 is able to determine the orientation of the accelerometer 16 relative to a vehicle 30 without using GPS data. FIGS. 8A to 8C show how the vehicle system is defined as three-dimensional Euclidean space, where the x- and y-axes are orthogonal to the direction of gravity. FIG. 8A shows a side view of the vehicle 30, FIG. 8B shows a head-on view, and FIG. 8C shows a top view. The Earth's gravity vector is aligned with the z-axis, i.e. pointing in the direction of the vehicle top and bottom. The vehicle front and back are aligned along the x-axis and the vehicle sides are aligned along the y-axis. The arrow in FIG. 8A indicates the vehicle's forward direction of motion. The dongle 2 has no fixed installation requirements in the vehicle 30.

Firstly, the x- and y-rotation of the dongle 2 relative to the vehicle coordinate system is determined in vehicle stand still, e.g. as known from the OBD data, so as to avoid the measurement of dynamic acceleration parts. This is shown as angles $\alpha$ and $\beta$ relative to the gravity vector in FIGS. 8A and 8B (also known as "pitch" angle $\alpha$ and "roll" angle $\beta$). The angles $\alpha$ and $\beta$ relative to the earth's gravity are used to determine a "mean inclination vector". This vector is used to calculate a rotational matrix which is used during driving to rotate each sample vector measured by the accelerometer 16 to the vehicle coordinate system. Secondly, the z-rotation of the dongle 2 relative to the vehicle system is determined as an angle $\Phi$ seen in FIG. 8C (also known as the "yaw" angle). The mean inclination vector can be subtracted from each sample vector measured by the accelerometer 16 to leave only the dynamic acceleration parts, i.e. removing the acceleration part due to earth's gravity. The x- and y-components of the resulting vector point somewhere in the xy-plane of the vehicle 30. However, the z-component is not necessarily zero if the vehicle is not driving orthogonally to its centre of gravity, e.g. driving on a hill or cambered surface. If the z-component can be neglected then the three-dimensional vector can be transformed to a two-dimensional vector in the xy-plane.

To determine the angle $\Phi$ of the dongle 2 (and hence of the accelerometer 16) representing a z-rotation relative to the vehicle system, the direction of the two-dimensional vector in the xy-plane is calculated using OBD speed data. The processor 10 looks at the OBD speed data to identify situations where the vehicle speed is steadily increasing or decreasing, and where the direction of acceleration measured by the accelerometer 16 does not change. This indicates that the vehicle 30 is driving straight and accelerating or breaking, thus the measured vector is in line with the x-direction of the vehicle 30. For example, the processor 10 may determine when the OBD speed values are increasing or decreasing for a predetermined period of time, e.g. a minimum of three seconds. During this period the two-dimensional vectors in the xy-plane are also monitored, to see whether their magnitude stays greater than a predefined threshold and to see whether they point in a constant direction. Statistical filtering may be applied to make the method more reliable. For example, the mean direction and direction variance of the two-dimensional vectors may be calculated and the processor 10 may check whether the variance stays below a predefined threshold. If the predetermined conditions are met, then the mean direction is determined to match the heading angle during a vehicle acceleration or breaking situation and therefore match the x-direction of the vehicle 30. The angle difference Φ between the alignment of the dongle 2 and the vehicle coordinate system may be stored in the memory 12.

With knowledge of the installation position of the dongle 2 in the vehicle 30, each sample vector measured by the accelerometer 16 can be rotated to fit the coordinate system of the vehicle 30, i.e. the dongle 2 is able to self-calibrate without needing any GPS data. The processor 10 is then able to use data from the accelerometer 16 to categorise driving events into classes e.g. braking, acceleration, cornering (right curve), cornering (left curve). Events with a minimum duration of 500 ms may be detected and stored in the memory 12.

In addition to the collection of OBD data and risk profile data that is provided to the external server 6 for long-term storage, the dongle 2 is further arranged to continually aggregate OBD data and acceleration data from the accelerometer 16 to determine live risk profile data in respect of a current journey being made by the vehicle in which the dongle 2 is installed. The live risk profile data is updated as the journey progresses, and the most recent data is stored in memory 12 of the dongle 2. This live risk profile data typically includes the following performance indicators:

braking profile: counts the number of events with a g force value in a given range—each band of the histogram represents 50 mg ($10^{-3}$ g)—profile extends from 250 mg to 1000 mg acceleration profile: counts the number of events with a g force value in a given range—each band of the histogram represents 50 mg ($10^{-3}$ g)—profile extends from 250 mg to 1000 mg cornering (left) profile: counts the number of events with a g force value in a given range—each band of the histogram represents 50 mg ($10^{-3}$ g)—profile extends from 250 mg to 1000 mg cornering (right) profile: counts the number of events with a g force value in a given range—each band of the histogram represents 50 mg ($10^{-3}$ g)—profile extends from 250 mg to 1000 mg idling time: sum of the time periods in which the vehicle was determined to be idling (engine running, i.e. rpm>0, but vehicle speed=0).

The live risk profile data is periodically transmitted to the smartphone 4 during the journey, whereupon it can be used to generate score values indicative of the current driving performance. For example, in the screenshot from an application (or "app") running on the smartphone 4 shown in FIG. 9A, four separate score values are generated. The first is indicative of "acceleration", and is based on the proportion of acceleration events with a g force above a certain threshold—has a value of 67% in FIG. 9A. The second is indicative of "braking", and is based on the proportion of braking events with a g force above a certain threshold—has a value of 42% in FIG. 9A. The third is indicative of "cornering", and is based on the proportion of cornering events, both left and right, with a g force above a certain threshold—has a value of 73% in FIG. 9A. Finally, the fourth is indicative of "idling", and is based on the time spent idling during the journey in relation to the total engine run time—has a value of 89% in FIG. 9A. In these examples, the higher the score, i.e. the closer to 100%, the better the driver is performing during the journey. An average of the four score values in shown in the centre of the screen—in this case 67%—together with an icon (a smiling car) indicating the performance of the driver.

Figure 9A:
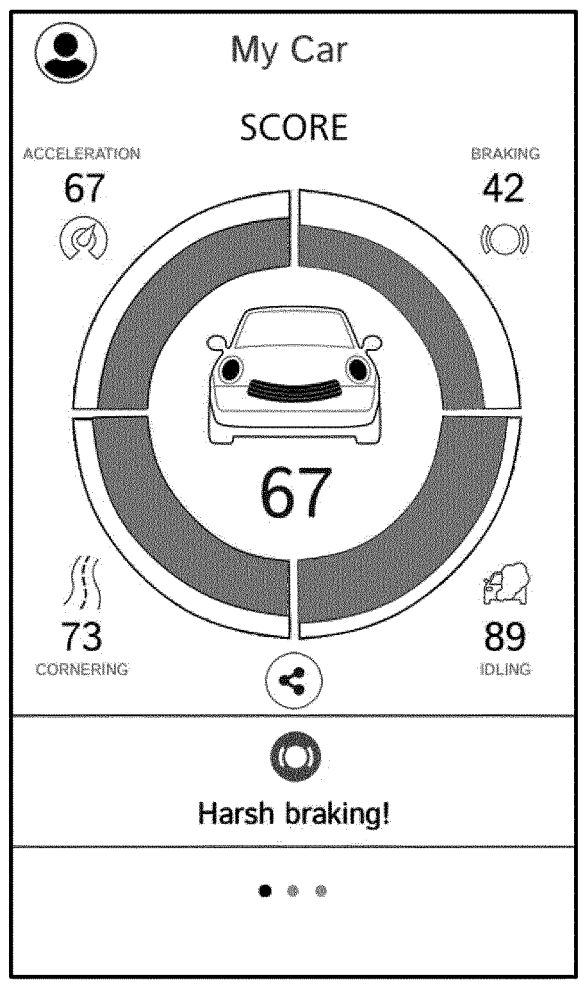
FIGS. 9A to 9D show exemplary screens that can be displayed on a mobile telecommunications of the collection system.

FIG. 9A also shows an icon that can be selected by the driver to share the score achieved for a journey on a suitable social media platform. A message can also be seen in FIG. 9A indicating the occurrence of a "harsh braking" event. These messages are displayed, and optionally are also accompanied by an audio or haptic alert, when an acceleration, braking, cornering or idling event of a certain significance is detected by the dongle 2.

Figure 9B:
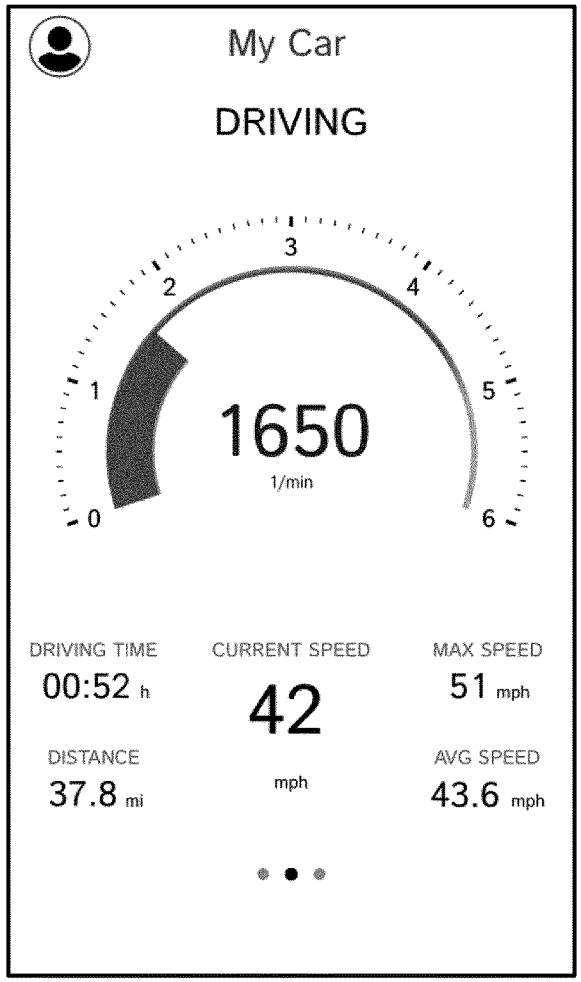
Figure 9C:
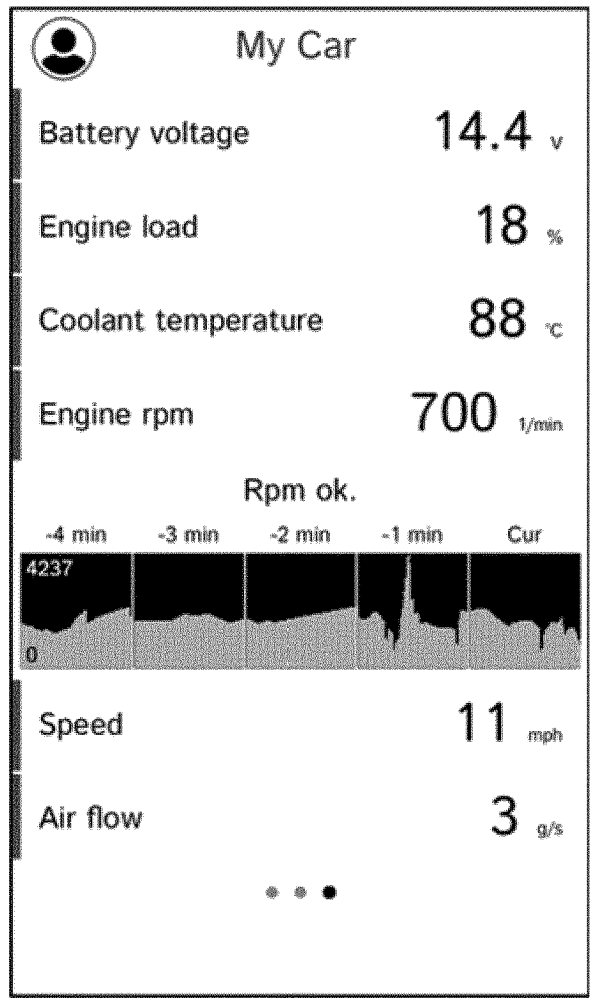

FIGS. 9B and 9C show other screenshots from the app running on the smartphone 4 providing other data, e.g. engine rpm, driving time, distance, current speed maximum speed, average speed, engine load, coolant temperature, etc, about the current journey being made by a vehicle.

Figure 9D:
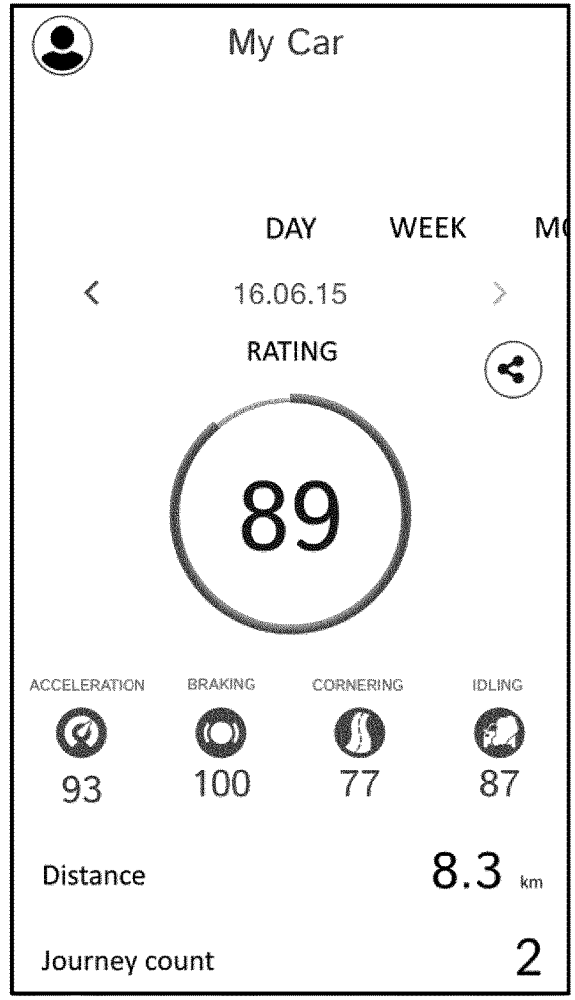

FIG. 9D shows a another screenshot from the app running on the smartphone 4, but in contrast to FIGS. 9A, 9B and 9C, the data shown on this screen is not provided in real-time from the dongle 2, but is instead based on risk profile data obtained from the server 6 and shows a summary of the driver's performance over longer periods of time, e.g. on a daily basis, a weekly basis, a monthly basis, etc.

Figure 10:
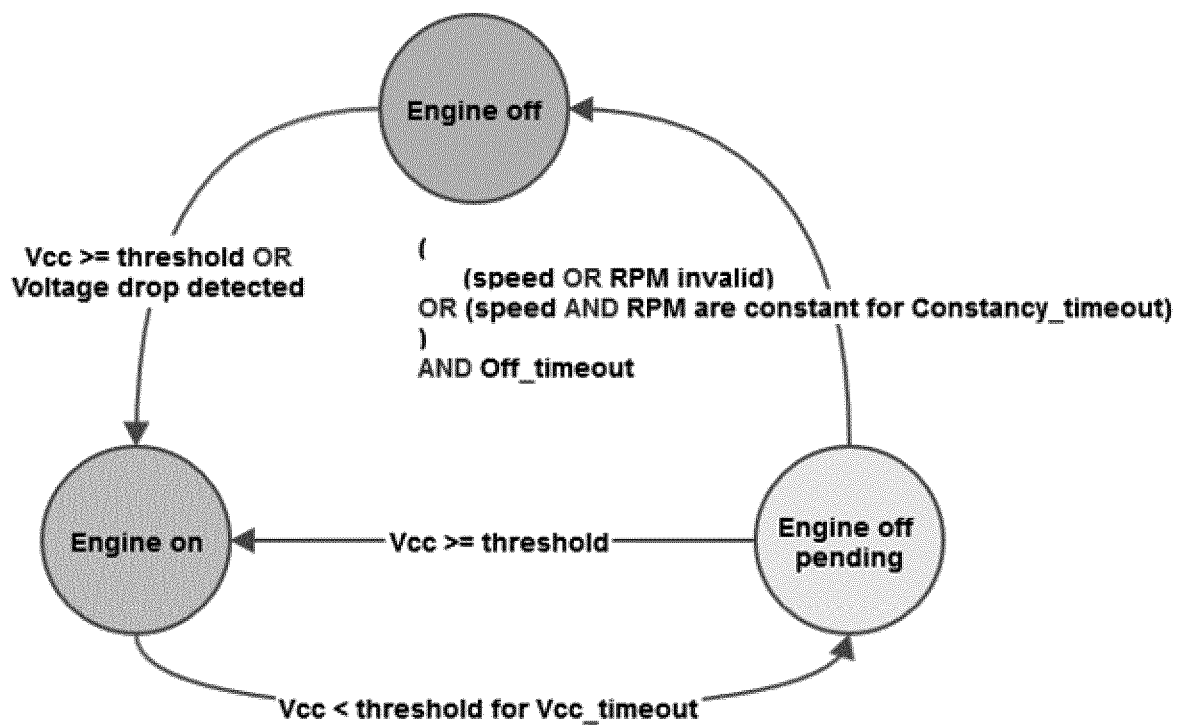
FIG. 10 illustrates a process for engine state detection that may be carried out by an OBD data collection device.

FIG. 10 illustrates an exemplary method for determining a vehicle engine state by monitoring a voltage at the OBD connector 8 in combination with OBD data relating to vehicle speed and/or engine revolutions (rpm). In smart-charging vehicles, the point in time that the alternator starts charging the battery, signalled by a rise in the voltage level to above a threshold of 13.2 volts (V), is unpredictable to a third party, which renders it inappropriate to determine the engine state solely based on voltage levels. Instead, this method detects an engine "on" state by detecting a temporary voltage drop of at least 2 V. Although it will be seen from FIG. 10 that the OBD connector 8 continues to detect when the voltage level rises to a level greater than or equal to a threshold of 13.2 V, as this remains an indicator of the engine being in an "on" state for older vehicles that do not use smart-charging technologies.

Figure 11:
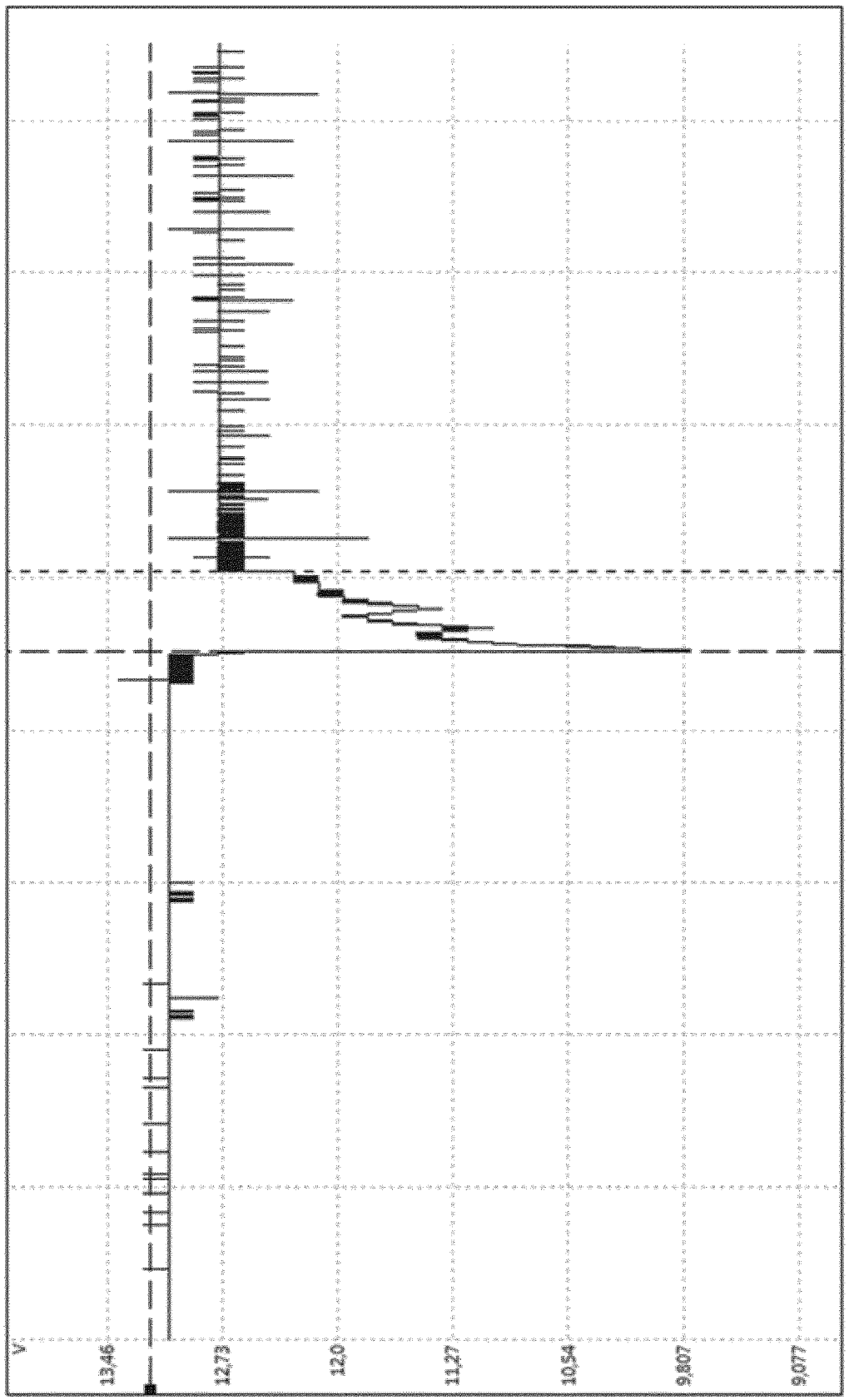
FIG. 11 provides an example of a voltage spike detected at the OBD connector when the engine is started.

FIG. 11 illustrates the significant voltage drop that occurs each time the engine is started, resulting in spikes that are between 400 ms and 1000 ms long. These voltage spikes are highly distinguishable from the far smaller voltage drops that may be caused by any other electrical component being connected to the battery. A voltage sampling frequency of 8 Hz may be chosen so as to reliably detect such voltage spikes. An integral of three samples is compared to a mid-term average and, if large enough, the processor 10 in the dongle 2 notes an "engine on" event. Even if an attempt to start the engine fails, which is impossible to detect, the vehicle's ECU will be awake and can provide an update to the OBD dongle 2.

Figure 12:
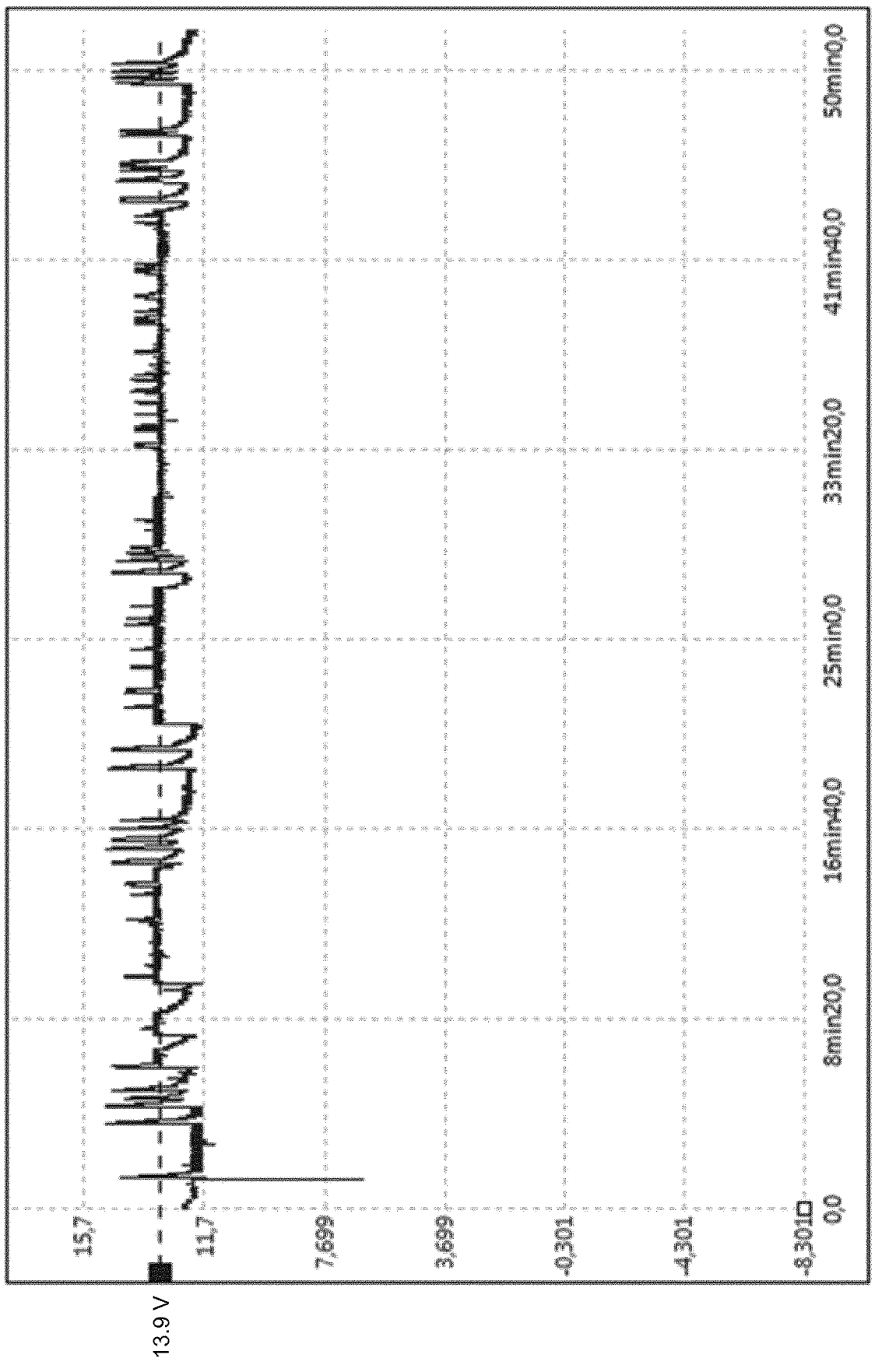
FIG. 12 provides an example of the typical changes in voltage level as a function of time for a smart-charging vehicle.

FIG. 12 illustrates how the voltage level can drop below the normal threshold of 13.2 V at any time, due to smart-charging, even though the vehicle is still driving with the engine running. In order to take this into account, OBD data relating to vehicle speed and rpm are taken into account so as to reliably detect an engine "off" state. It may be seen from FIG. 10 that the voltage $V_{cc}$ at the OBD connector 8 is periodically compared to a threshold, e.g. of 13.2 V. If $V_{cc}$ is found to have dropped below the threshold for a time period $V_{cc\_}$timeout of 3 seconds, then the processor 10 detects a pending engine "off" state. In order to confirm the pending engine "off" state, the vehicle speed and rpm are assessed before issuing a final engine "off" state. To detect when the engine has actually stopped, either the OBD data relating to vehicle speed and rpm must be invalid, because the vehicle ECU has stopped transmitting, or the OBD data values must be constant (also including zero) for a time period of Constancy_timeout. For example, a period of 2 to 5 seconds may be chosen for Constancy_timeout. This is because there are vehicles that report constant non-zero values for speed and rpm even after the engine has been stopped. Finally, the processor 10 waits for a final time period Off_timeout, e.g. of 10 seconds before detecting a transition from the pending engine "off" state to a final engine "off" state. The time periods of Constancy_timeout and Off_timeout may add up to a total wait time of 10 to 20 seconds before a final engine "off" state is issued.

Upon determining a final engine "off" state the processor 10 instructs an end to the collection of OBD data from the vehicle OBD port. The dongle 2 may then enter a sleep mode until a further change in engine state is determined. The dongle 2 may support different levels of operation, namely running and sleeping, to reduce power consumption when the vehicle's engine is not running, and to avoid disturbing the car's ECU when the car is not in use. In the sleeping mode, the dongle processor 10 is halted until it wakes up because of an interrupting execution, for example from a voltage drop being detected. Once the dongle 2 is running again, the collection of OBD data is resumed.

The engine state detection described in relation to FIG. 10 is also used, in combination with OBD data relating to the vehicle speed and engine revolutions, to detect when a vehicle begins and ends a journey. In particular, a new journey can be determined to have begun when there is a predetermined period of time between a detected engine 'off' state and a detected engine 'on' state, and the vehicle is detected to have begun driving, e.g. based on the vehicle speed and/or engine speed (or revolutions) being greater than zero. The predetermined period of time can be 2 hours. This detection of a new journey is used to determine when to delete (or reset to zero) the risk profile data stored in the memory 12, and therefore when to begin creating a new profile for the new journey. As will be appreciated, the stored risk profile data is not reset until a new journey is started, such that if the driver stops their vehicle and comes back to it a number of hours later, e.g. 5 hours, then they are still able to view the scores for the last journey (of course until they start driving again). In addition, a short break in a journey, e.g. of an hour, does not cause the risk profile data to be reset; the risk profile data simply continues to be updated as the vehicle is driven until an end of the journey is detected.

Figure 13:
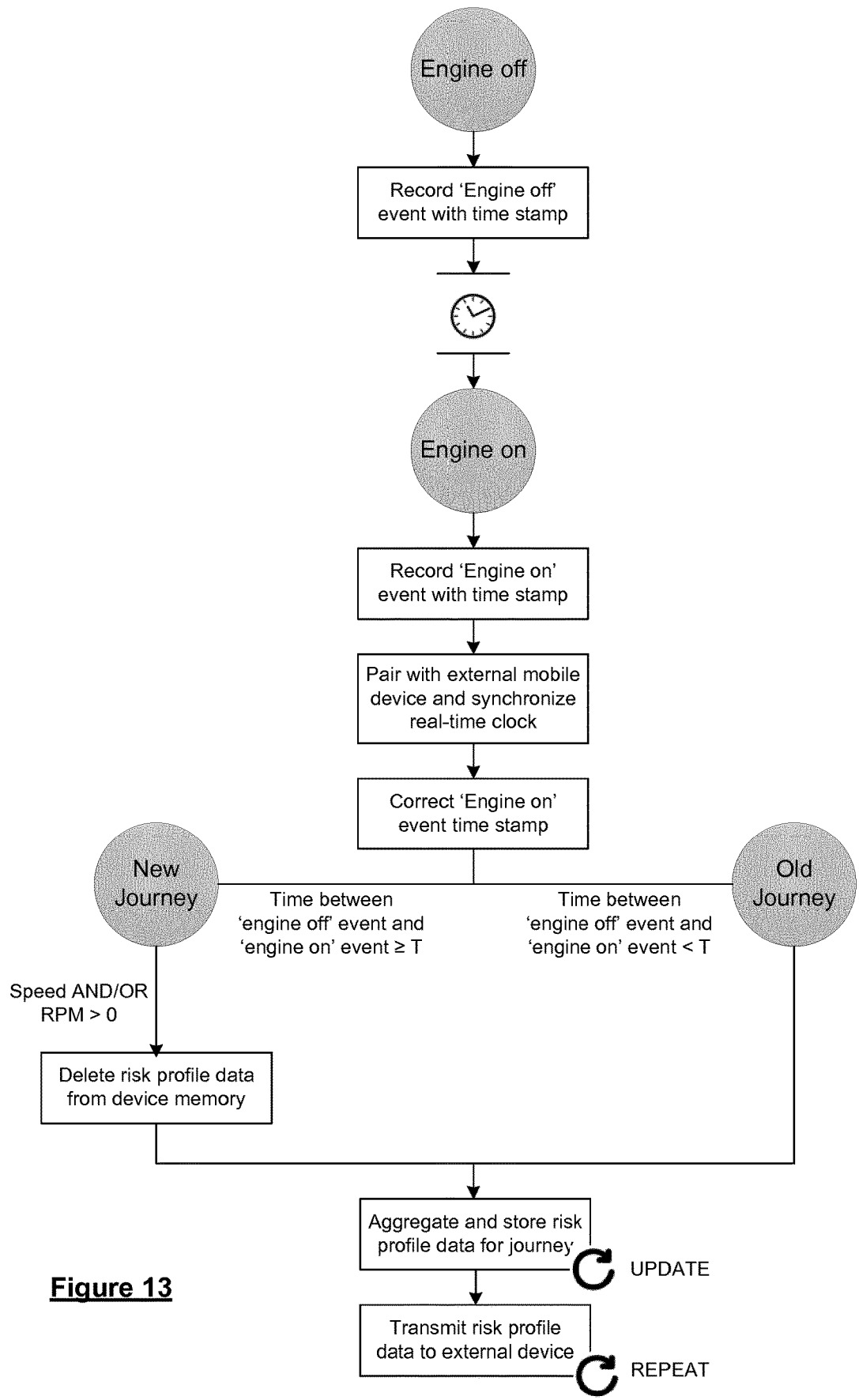
FIG. 13 illustrates a method for providing risk profile data for the current or last journey to an external device according to an embodiment of the present invention.

A summary of the method for providing risk profile data for the current or last journey to an external device in accordance with an embodiment of the present invention is shown in FIG. 13.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to the use of a smartphone (or other similar mobile telecommunications device) to transfer data to and from the OBD dongle and server, it will be appreciated that any suitable form of gateway (or Internet-enabled device) may be used to provide the necessary connection. For example, the OBD dongle may communicate wirelessly with a computing device, such as a portable computer, laptop, or other similar mobile device, which in turn communicates with the server using any suitable means, e.g. via the telecommunications network.

It will also be well understood by persons of ordinary skill in the art that whilst the preferred embodiment may implement certain functionality by means of software, that functionality could equally be implemented solely in hardware (for example by means of one or more SICs (application specific integrated circuit)) or indeed by a mix of hardware and software.

Lastly, it should be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specially enumerated in the accompanying claims at this time.

The invention claimed is:

1. A wireless communication device for collecting vehicle on-board diagnostics (OBD) data, the device comprising:
   a connector for connecting the device to an OBD port of a vehicle to receive OBD data;
   a processor configured to continually aggregate first data comprising one or more of the OBD data and acceleration data from an acceleration sensor into second data during a first journey made by the vehicle, said second data comprising one or more of scalar indicators and histogram indicators;
   a memory for storing the latest second data relating to the first journey; and
   a short-range wireless transceiver configured for short-range communication with an external mobile device located within the vehicle, wherein the short-range wireless transceiver is configured to wirelessly transmit the stored second data to the external mobile device located within the vehicle to provide live feedback to a driver of the vehicle during the first journey,
   wherein the processor is further configured to determine an engine state of the vehicle and to detect when the vehicle begins and ends a journey based on said determined engine state and OBD data relating to one or more of vehicle speed and engine revolutions, and
   wherein the processor is further configured to cause the stored second data relating to the first journey to be deleted from the memory upon detection that the vehicle has ended the first journey and begun a second journey, wherein the second journey is a next occurring journey following the first journey.

2. The device of claim 1, wherein said second data comprises a plurality of the one or more of scalar indicators and histogram indicators, and wherein at least a first of the one or more of scalar indicators and histogram indicators and a second of the one or more of scalar indicators and histogram indicators are updated at different frequencies.

3. The device of claim 1, wherein the processor is configured to detect that the vehicle has begun a new journey when there is a predetermined period of time between a detected engine 'off' state and a detected engine 'on' state, and the one or more of vehicle speed and engine revolutions are greater than zero.

4. The device of claim 1, comprising a real-time clock powered by the connector, and wherein the processor is configured to apply time stamps to one or more of the OBD data and determined events, said determined events comprising a detected engine 'on' state and an engine 'off' state.

5. The device of claim 4, wherein the processor is arranged to determine when the device has been disconnected from the vehicle OB) port and to correct the one or more of the time-stamped OBD data and determined events by synchronising with an external reference clock signal provided by the mobile device.

6. The device of claim 5, wherein the time stamp associated with a detected engine 'on' state is corrected using the external reference clock signal before it is compared to the time stamp of a previously detected engine 'off' state.

7. The device of claim 1, wherein the short-range wireless transceiver is configured to wirelessly transmit the stored second data to the external mobile device at a predetermined frequency during the journey, wherein said predetermined frequency is different from a frequency at which the second data stored in the memory is updated.

8. The device of claim 1, wherein the second data comprises one or more scalar indicators, and wherein each scalar indicator represents a single value for a particular category of data collected in a given time period, wherein the time period is one of: (i) the time from the start of the journey to the current time; or (ii) the time from the start of the journey to the end of the journey.

9. The device of claim 8, wherein the one or more scalar indicators represent one or more of: distance; idling time; average speed; and a count of the number of events when acceleration above a predetermined acceleration value is detected.

10. The device of claim 1, wherein the second data comprises one or more histogram indicators, and wherein each histogram indicator represents a distribution for a particular category of data collected in a given time period, wherein the time period is one of: (i) the time from the start of the journey to the current time; or (ii) the time from the start of the journey to the end of the journey.

11. The device of claim 10, wherein the one or more histogram indictors represent one of more of: (i) a driving time by speed profile recording the time driven in different speed ranges; (ii) a mileage by speed profile recording the distance traveled in different speed ranges; (iii) an engine rpm profile recording how long the engine is operated in different rpm ranges; (iv) an engine load profile recording how long the engine is operated in different load ranges; (v) a throttle usage profile recording how long the vehicle is driven at different throttle position ranges; (vi) an engine temperature profile recording how long the engine is operated at different engine coolant temperature ranges; (vii) a braking profile recording the number of braking events with a g force value in different g force ranges; (viii) an acceleration profile recording the number of acceleration events with a g force value in different g force ranges; (ix) a cornering (right) profile recording the number of right cornering events with a g force value in different g force ranges; and (x) a cornering (left) profile recording the number of left cornering events with a g force value in different g force ranges.

12. The device of claim 1, comprising the acceleration sensor for providing the acceleration data during the journey made by the vehicle.

13. The device of claim 12, wherein the processor is further configured to determine an orientation of the acceleration sensor based on the collected OBD data, and to transform the acceleration data measured by the acceleration sensor from the frame of reference of the device to the frame of reference of the vehicle.

14. The device of claim 1, wherein the processor is configured to detect an engine 'off' state from a voltage value that is less than a threshold in combination with OBD data relating to one or more of vehicle speed and engine revolutions.

15. The device of claim 14, wherein the processor detects a pending engine 'off' state from a voltage value that is less than a threshold for a first predetermined time period, and confirms the pending engine 'off' state from one of: (i) OBD data indicating one or more of vehicle speed and engine revolutions are constant for a second predetermined time period; and (ii) OBD data relating to one or more of vehicle speed and engine revolutions no longer being received at the vehicle OBD port.

16. A collection system for vehicle on-board diagnostics (OBD) data, the system comprising:
    a wireless communication device according to any preceding claim; and
    the external mobile device operatively in communication with the wireless communication device to receive second data therefrom, wherein the external mobile device comprises a user interface for providing information based on the received second data to a driver of the vehicle.

17. The system of claim 16, wherein the short-range wireless transceiver is configured to wirelessly transmit the stored second data to the external mobile device at a predetermined frequency set by an application running on the external mobile device.

18. The system of claim 16, wherein the external mobile device is configured to determine one or more score values indicative of driving performance using the received second data for the particular journey being traveled or that has just traveled, and to display the determined one or more score values on a display of the mobile device.

19. A method for transmitting vehicle on-board diagnostics (OBD) data collected by a wireless communication device to an external mobile device located within the vehicle, comprising:
    receiving first data comprising OBD data from an OBD port of a vehicle;
    continually aggregating one or more of the OBD data and acceleration data from an acceleration sensor into second data during a first journey made by the vehicle, said second data comprising one or more of scalar indicators and histogram indicators;
    storing the latest second data relating to the first journey in a memory;
    wirelessly transmitting, using a short-range wireless transceiver, the stored second data to the external mobile device located within the vehicle to provide live feedback to a driver of the vehicle during the first journey;
    determining an engine state of the vehicle and detecting when the vehicle begins and ends a journey based on said determined engine state and OBD data relating to one or more of vehicle speed and engine revolutions; and
    deleting the stored second data relating to the first journey from the memory upon detection that the vehicle has ended the first journey and begun a second journey, wherein the second journey is a next occurring journey following the first journey.

20. A non-transitory computer readable medium comprising computer readable instructions that, when executed by at least one processor of a device having a connector for connecting the device to a vehicle OBD port, causes the device to perform the method of claim 19.

* * * * *